United States Patent
Low et al.

(10) Patent No.: US 9,392,496 B2
(45) Date of Patent: Jul. 12, 2016

(54) APPARATUS AND SYSTEM FOR MULTI-MODE WIRELESS COMMUNICATION

(71) Applicant: Intel Corporation, Santa Clara, CA (US)

(72) Inventors: Su-Lin Low, San Diego, CA (US); Wei-Dong Zhang, San Diego, CA (US); Hausting Hong, San Diego, CA (US); Alfred Lee, San Diego, CA (US); Michael Cheng-Lai Lee, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 14/217,660

(22) Filed: Mar. 18, 2014

(65) Prior Publication Data
US 2014/0274065 A1    Sep. 18, 2014

Related U.S. Application Data

(60) Provisional application No. 61/803,102, filed on Mar. 18, 2013.

(51) Int. Cl.
| | | |
|---|---|---|
| *H04W 36/30* | (2009.01) | |
| *H04W 36/00* | (2009.01) | |
| *H04W 88/06* | (2009.01) | |
| *H04W 36/14* | (2009.01) | |

(52) U.S. Cl.
CPC ...... *H04W 36/0022* (2013.01); *H04W 36/0066* (2013.01); *H04W 36/14* (2013.01); *H04W 88/06* (2013.01)

(58) Field of Classification Search
CPC ...................................................... H04W 36/30
See application file for complete search history.

(56) References Cited

U.S. PATENT DOCUMENTS

| | | | | |
|---|---|---|---|---|
| 9,125,120 B2 * | 9/2015 | Low | ................ | H04W 4/00 |
| 2009/0042576 A1 * | 2/2009 | Mukherjee | .......... | H04J 11/0093 455/436 |
| 2013/0005397 A1 * | 1/2013 | de Jong | ................. | H04W 36/14 455/552.1 |
| 2013/0265937 A1 * | 10/2013 | Jain | ....................... | H04W 4/005 370/328 |
| 2013/0310035 A1 * | 11/2013 | Gouriou | .............. | H04W 60/005 455/435.1 |
| 2014/0242984 A1 * | 8/2014 | Mujtaba | .............. | H04W 76/046 455/434 |

* cited by examiner

*Primary Examiner* — Vladimir Magloire
*Assistant Examiner* — Frank Donado
(74) *Attorney, Agent, or Firm* — Forefront IP Lawgroup, PLLC

(57) ABSTRACT

A multi-mode controller (MMC) manages communications on a wireless device to provide interoperability between multiple radio access technologies (RATs) or radio access protocols.

17 Claims, 26 Drawing Sheets

| | |
|---|---|
| MMCRATApi_PowerUp_Req | MMC sends this request to RAT to power up the RAT protocol stack. |
| MMCRATApi_PowerUp_Rsp | RAT sends this rsp to MMC to confirm that the RAT stack is powered up. |
| MMCRATApi_PowerDown_Req | MMC sends this request to RAT to power down the RAT protocol stack. |
| MMCRATApi_PowerDown_Rsp | RAT sends this rsp to MMC to confirm that the RAT stack is powered down. |
| MMCRATApi_RAT_Only_Mode_Req | MMC sends this request to RAT for "RAT Only Mode" operation. The RAT shall enter this "RAT Only Mode" state and send RSP to MMC. E.g. LTE Only, CDMA Only modes. |
| MMCRATApi_RAT_Only_Mode_Rsp | RAT sends this response to MMC to confirm its starting of "RAT Only Mode" operation. |
| MMCRATApi_Global_Mode_Req | MMC sends this request to RAT for different global modes, such as "LTE/Legacy 3GPP Mode", "LTE/CDMA 3GPP2" operation. The RAT shall enter the global mode and send RSP to MMC. |
| MMCRATApi_Global_Mode_Rsp | RAT sends this response to MMC to confirm its starting of global mode operation. |
| MMCRATApi_Acquisition_Req | MMC sends this request to start the RAT system scan if the RAT has not acquired a system. The RAT shall start scanning system based on the "Cause" of this request. RAT shall send RSP to MMC after it acquires the best acceptable system or determines no system available by the time. RAT shall only do system acquisition and does NOT conduct registration to network. No transmit action shall happen. If RAT has already acquired a system, no scan action needs to be taken except send RSP to MMC. |

FIG. 15A

| | |
|---|---|
| MMCRATApi_Acquisition_Rsp | RAT sends this response to MMC to report the acquisition result. |
| MMCRATApi_MCC_Search_Req | MMC sends this request to get the Mobile Country Code (MCC) from the RAT network. RAT shall try to get the MCC code and send to MMC in the RSP.<br>MMC only sends this request after it gets confirm that RAT system is available. |
| MMCRATApi_MCC_Search_Rsp | RAT sends this response to MMC to report MCC acquisition result. |
| MMCRATApi_PS_Reg_Req | MMC sends this request to start RAT system scan and register to the acquired system. If RAT has not acquired a system, RAT shall start scanning the frequency band per relevant standard. RAT shall only camp on the system with same or higher priority as specified( i.e. priority class value is not greater than the specified value). RAT shall register to the network after camping on a qualified system. If RAT has already acquired a qualified system, it shall start register to the network directly. If the currently camping system is less priority then expected, RAT may start re-scan the channels to find a qualified system.<br>RAT shall send RSP to MMC after it gets registration result on the qualified system or fails for any reason. |
| MMCRATApi_PS_Reg_Rsp | RAT sends this response to MMC to report the PS registration result. |
| MMCRATApi_No_Service_Req | MMC sends this request to put RAT into non-operation power-save state(disabled state). MMC will /has set Packet Service (PS) up on other RAT. If there is any packet call connection on the current RAT, it shall be released and detached first. RAT shall send RSP to MMC after entering disabled state. |

FIG. 15B

| | |
|---|---|
| MMCRATApi_No_Service_Rsp | RAT sends this response to MMC to report the disable result. After sending this response, RAT shall stop any transmit action and stay in disabled state. |
| MMCRATApi_Network_State_Change_Ind | RAT sends this indication to report any state change in the RAT. It may trigger GMSS actions to maintain system availability.<br>The network status include:<br>SYSLOST: RAT loses system.<br>INIT: Initial state after power up.<br>ACQUIRED: RAT has camped on the best available system but registration has not succeeded or not conducted.<br>REGISTERED: RAT has succeeded registration and attach on the best available system.<br>CONNECT: RAT is in connected state.<br>DISABLED: RAT is in Disabled state after No_Service_Req.<br>POWERED_DOWN: RAT is in powered down state. |
| MMCRATApi_Cell_GlobalId_Req | RAT sends this Request to get the current cell global Id of the specified RAT. |
| MMCRATApi_Cell_GlobalId_Rsp | MMC sends this RSP to return the requested cell global ID data. |

FIG. 15C

| | |
|---|---|
| MMCRATApi_OtherRAT_Meas_Cmd | This API shall be used by the current RAT to request interRAT measurements to be performed by other RAT systems, after receiving the measurement configuration containing interRAT measurements from the current RAT network (E-UTRAN, CDMA) by means of dedicated signaling. |
| MMCRATApi_OtherRAT_Meas_Ind | This API shall be used by MMC to send interRAT measurement results to the RAT in response to MMCRATApi_OtherRAT_Meas_Cmd received from RAT earlier. MMC shall send the measurement results of the measurement objects periodically as indicated. |
| MMCRATApi_Idle_OtherRAT_Meas_Cmd | This API shall be used by the current RAT to request interRAT measurements to be performed by other RAT systems, while in Idle mode. This measurement information is received from overhead signaling in the current RAT.<br>For eg, LTE uses this to trigger CDMA2000 neighboring cell measurements in LTE idle mode based on SIB8 contents received from E-UTRAN. LTE shall send two separate commands if CDMA2000 measurements are required from both 1xRTT and HRPD systems. |
| MMCRATApi_Idle_OtherRAT_Meas_Ind | This API shall be used by MMC to send interRAT measurement results to the RAT in response to MMCRATApi_Idle_OtherRAT_Meas_Cmd received from RAT earlier. MMC shall send the measurement results of the measurement objects periodically as indicated. |

FIG. 16A

| | |
|---|---|
| MMCRATApi_RAT_Meas_Cmd | This API shall be used by MMC to request interRAT measurements to be performed by the current RAT when it is not the current serving system. For e.g., this API shall be used by MMC to trigger LTE neighboring cell measurements during CDMA2000 idle mode based on overhead message received from CDMA2000 Network. LTE shall use the neighboring E-UTRAN cells and other required parameters received in this API to start measurements on neighboring E-UTRAN cells. LTE shall start the measurements on reception of this command. |
| MMCRATApi_RAT_Meas_Ind | This API shall be used by RAT to send interRAT measurement results to MMC in response to MMCRATApi_RAT_Meas_Cmd received from MMC earlier. |
| MMCRATApi_RAT_Resel_Meas_Cmd | This API shall be used by MMC to request interRAT measurements to be performed by the current RAT for the cells which satisfied the initial reselection condition. For e.g. MMC uses this API to get the measurement results from LTE, of the E-UTRA cells for which EUTRAReselectTimer has expired while evaluating cell-reselection criteria. |
| MMCRATApi_RAT_Resel_Meas_Ind | This API shall be used by RAT to send interRAT measurement results to MMC in response to MMCRATApi_RAT_Resel_Meas_Cmd received from MMC earlier. |

FIG. 16B

| | |
|---|---|
| MMCRATApi_System_Change_Req | This API shall be used by RAT to trigger interRAT system change handoff/reselection, either as a result of redirection command received from the RAT network by means of dedicated signaling or interRAT cell reselection criteria has met for other RAT, with or without prior measurement info.<br>Note that this API is used in RATs where the handoff may be directed from the RAT network or where the reselection criteria is handled at the RAT stack. For other InterRAT reselection, MMC performs the reselection algorithm and triggers the handoff directly. |
| MMCRATApi_System_Change_Rsp | This API shall be used by MMC to send the status of system change request to RAT in response to MMCRATApi_System_Change_Req. |
| MMCRATApi_Stop_OtherRAT_Meas_Cmd | This API shall be used by RAT to stop any ongoing OtherRAT measurements which were either started by MMCRATApi_OtherRAT_Meas_Cmd or by MMCRATApi_Idle_OtherRAT_Meas_Cmd. |
| MMCRATApi_Stop_RAT_Meas_Cmd | This API shall be used by MMC to stop any ongoing RAT measurements which were started by MMCRATApi_RAT_Meas_Cmd or MMCRATApi_RAT_Resel_Meas_Cmd. |
| MMCRATApi_Cell_Info_PS_Reg_Req | MMC sends this request to start RAT registration on the cell based on the information provided in this API. If RAT has not acquired a system, RAT shall start acquiring the system based on the information received in this API. RAT shall register to this cell after camping, and shall send response to MMC after it completes the registration procedure. |
| MMCRATApi_Cell_Info_PS_Reg_Rsp | RAT shall send this response to MMC to report the PS registration result after it completes the registration procedure initiated by MMCRATApi_Cell_Info_PS_Reg_Req. |

FIG. 16C

| | |
|---|---|
| MMCRATApi_Default_Bearer_Req | MMC sends this command to RAT to request for a default bearer data path to be setup and attached. |
| MMCRATApi_Default_Bearer_Rsp | RAT sends this status in response to a prior default bearer attaching request. |
| MMCRATApi_Dedicated_Bearer_Req | MMC sends this command to RAT to request for a dedicated bearer data path to be setup and attached, for data service that requires specific Quality of Service (QOS) profile. |
| MMCRATApi_Dedicated_Bearer_Rsp | RAT sends this response to include Dedicated Bearer set up status. |
| MMCRATApi_Dedicated_Bearer_Ind | RAT sends this indication to MMC, in response to network-initiated Dedicated Bearer setup process. |
| MMCRATApi_Bearer_Disconnect_Req | MMC sends this command to RAT to request for a default or dedicated bearer to be disconnected. |
| MMCRATApi_Bearer_Disconnect_Rsp | RAT sends this to indicate status in response to a disconnection request for a particular bearer. |

FIG. 17A

| | |
|---|---|
| MMCRATApi_Bearer_Disconnect_Ind | RAT sends this to indicate status in response to a network initiated disconnection request |
| MMCRATApi_Bearer_Detach_Req | MMC sends this to request disconnect all active PDN connection. |
| MMCRATApi_Bearer_Detach_Rsp | RAT sends this in response to a request of PDN detaching. |
| MMCRATApi_DataConnection_Req | MMC sends this request to RAT to perform existing data connection control due to upcoming handover events, including Suspend, Resume, Disable, Release. |
| MMCRATApi_DataConnection_Rsp | RAT sends this rsp to MMC to inform the status of the data connection control request by MMC earlier. |

FIG. 17B

| | |
|---|---|
| MMCRATApi_CS_Params_Reg_Ind | This API is used for sending CDMA 1X CS parameters that was transmitted on other RAT overhead channels, and to trigger the 1X CS registration if not done yet. This API is also used for de-registrations such as sending of 1X SMS databurst to release IMS after LTE system loss. |
| MMCRATApi_GCSNA_Msg | This API is used for routing CDMA 1X CS layer 3 signaling messages encapsulated in a GCSNA message. These include access, control, and traffic channel messages. The CDMA system timing information is also provided if necc. |
| MMCRATApi_CS_CallSetup_Req | This API is used for triggering the initiation of a 1X CS call setup by the user/UI/Apps layer. When the 1X RAT receives this, if it doesn't have RF resource, it will wait till a CSFB or VCC redirection is triggered by the MMC. When other RAT receives this, it triggers a service request to the RAT network to begin CSFB/VCC actions. |
| MMCRATApi_CS_CallSetup_Rsp | This is the response for the request earlier. |
| MMCRATApi_1XCS_Redirection_Req | MMC sends this request to the 1XCS RAT, for triggering the redirection to the 1XCS network. For CSFB, the 1X target cellist may be included for to acquire immediately on the target 1X cells once the RF is available. For enhanced CSFB and VCC, this API triggers the handoff preparation setup, including information such as CDMA 1X parameters, which triggers the 1XCS stack to tunnel Origination through GCSNA protocol to the other RAT. |
| MMCRATApi_1XCS_Redirection_Rsp | This is the response for the request earlier, sent by 1XCS to MMC once the redirection is successful. |
| MMCRATApi_CS_CallRelease_Req | This API is used for triggering the release of a 1X CS call. |
| MMCRATApi_CS_CallRelease_Rsp | This is the response for the request earlier. |

FIG. 18

| | |
|---|---|
| MMCAPApi_Power_Up_Req | UI/Apps module sends this request to GMSS to start MMC operation. MMC will power up each RAT using the corresponding RAT API. |
| MMCAPApi_Power_Up_Rsp | GMSS module sends this RSP to UI/Apps to confirm after the power up actions are done. |
| MMCAPApi_Power_Down_Req | UI/Apps module sends this request to GMSS to stop MMC operation. MMC will power down each RAT using the corresponding RAT API. GMSS will save its parameters into flash also. |
| MMCAPApi_Power_Down_Rsp | GMSS module sends this RSP to UI/Apps to confirm after the power down actions are done. |
| MMCAPApi_Mode_Select_Req | UI/Apps sends this request to GMSS to switch the operation mode of the device, such as LTE_Only Mode, CDMA_Only Mode, Global Mode, etc. |
| MMCAPApi_Mode_Select_Rsp | GMSS module sends this response to UI/Apps to report the result of operation switch. |
| MMCAPApi_Mode_Query_Req | UI/Apps sends this request to GMSS to query operation mode of the device. |
| MMCAPApi_Mode_Query_Rsp | GMSS module sends this response to UI/Apps to report the current operation mode. |
| MMCAPApi_Service_Status_Req | UI/Apps sends this request GMSS to get the information of current PS service system type and its registration status. |
| MMCAPApi_Service_Status_Rsp | GMSS module sends this response to UI/Apps to report the current PS service system type and its registration status. |

FIG. 19A

| | |
|---|---|
| MMCAPApi_Service_Status_Ind | GMSS module sends this indication to UI/Apps to report the current PS service system type and its registration status. |
| MMCAPApi_UICC_Card_Status_Ind | UI/Apps UICC module sends this indication to GMSS to report the status change of the UICC card. |
| MMCAPApi_Packet_Call_Setup_Req | UI/Apps sends this to request a packet data call to be set up. |
| MMCAPApi_Packet_Call_Setup_Rsp | MMC sends this in response of prior packet call setup request. |
| MMCAPApi_Packet_Reconnect_Ind | MMC sends this unsolicited message to UI/Apps to indicate a reconnection of packet data largely due to a PPP re-sync was happening and UI/Apps needs to make a note of it in case that IP addresses for mobile or other information has changed. |
| MMCAPApi_Packet_Disconnect_Req | UI/Apps sends this message to terminate an active packet data call with a specific PDN. |
| MMCAPApi_Packet_Disconnect_Rsp | MMC sends this message to indicate modem has fulfilled required functions to disconnect packet data service. |
| MMCAPApi_Packet_Detach_Req | UI/Apps sends this command to detach all PDNs. |
| MMCAPApi_Packet_Dedicated_Setup_Req | UI/Apps sends this message to initiate dedicated bearer set up for packet services requiring QOS differentiation. |
| MMCAPApi_Packet_Dedicated_Setup_Rsp | MMC sends this message in response to MMCAPApi_Packet_Dedicated_Setup_Req. |

FIG. 19B

| | |
|---|---|
| MMCAPApi_Packet_Dedicated_Setup_Ind | MMC sends this message to initiate dedicated bearer set up for packet services requiring QOS differentiation, from the network. It forwards the content to UI/Apps so an appropriate BearerId can be included in IP packet routing at the reverse if this link was negotiated in this message. The QoS info included in this packet may carry forward and/or reverse link attributes. |
| MMCAPApi_PDN_Table_Setup_Req | UI/Apps sends this message to initialize all possible PDNs supported by carrier with its corresponding PDN ID, APN and PDN type. |
| MMCAPApi_Set_Global_IPv6_Addr | UI/Apps sends this message to set global IPv6 address for a particular PDN once it obtains prefix through router discovery protocol along with the Interface ID (IID) address from default bearer information. |

FIG. 19C

APPARATUS AND SYSTEM FOR MULTI-MODE WIRELESS COMMUNICATION

CROSS REFERENCE TO RELATED APPLICATIONS

This application claims the benefit of U.S. provisional patent application Ser. No. 61/803,102, filed 2013 Mar. 18, and having the title "APPARATUS AND SYSTEM FOR MULTI-MODE WIRELESS COMMUNICATION," which is incorporated herein by reference in its entirety.

BACKGROUND

1. Field of the Disclosure

The present disclosure relates generally to communications and, more particularly, to wireless communications.

2. Description of Related Art

Numerous cellular technologies exist, such as, for example, third generation (3G) and fourth generation (4G) long term evolution (LTE), a variety of code-division multiple access (CDMA) technologies, and a variety of other radio-access technologies (RAT, or radio access protocols). In view of the existence of different RATs, there are ongoing efforts to improve inter-RAT handshaking and inter-RAT handoffs.

SUMMARY

The present disclosure provides systems and methods for multi-mode wireless communications. Briefly described, one embodiment comprises a multi-mode controller (MMC) that manages communications on a wireless device to provide interoperability between multiple radio access technologies (RATs, or radio access protocols).

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 15A, 15B, and 15C (collectively, FIG. 15) are tables showing one embodiment of application program interfaces (APIs) for global mode system selection (GMSS).

FIGS. 16A, 16B, and 16C (collectively, FIG. 16) are tables showing one embodiment of APIs for measurement and reselection (MEAS).

FIGS. 17A and 17B (collectively, FIG. 17) are tables showing one embodiment of APIs for packet data control (PKT).

FIG. 18 is a table showing one embodiment of APIs for circuit switch control (CSC).

FIGS. 19A, 19B, and 19C (collectively, FIG. 19) are tables showing one embodiment of APIs for controlling an application processor (AP).

DETAILED DESCRIPTION OF THE EMBODIMENTS

Figure 1:
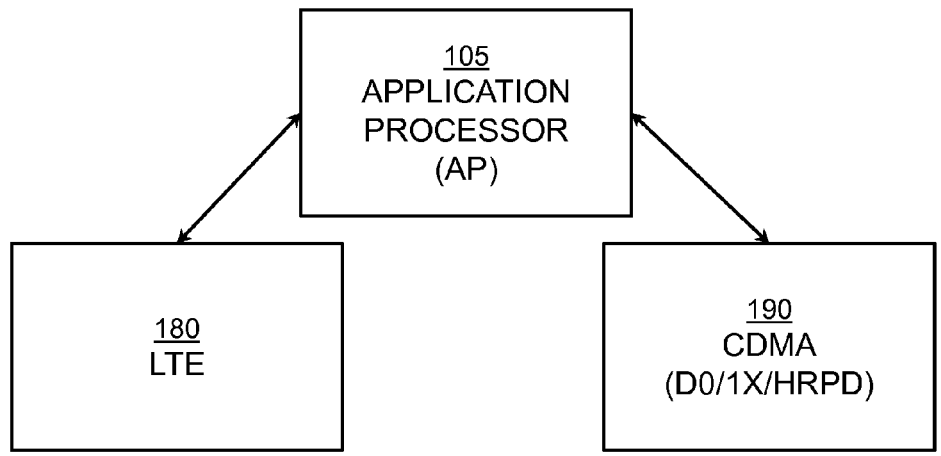
FIG. 1 is a block diagram showing a conventional wireless device configuration.

Some conventional multi-mode devices (e.g., smartphone, tablet, netbook, etc.) support both a code division multiple access (CDMA) protocol and a long-term evolution (LTE) protocol. For some of those multi-mode configurations (e.g., such as that shown in FIG. 1), an application processor (AP) 105 houses a main user interface (UI) and an applications layer (APPS). Those multi-mode devices communicate with the different modem radio access technologies (RATs, or radio access protocols), such as LTE 180 and CDMA 190, through inter-processor communication schemes.

In order to ensure seamless packet data service delivery from one radio access technology (RAT) to another, the AP 105 must orchestrate the selection of a network to acquire and perform inter-RAT handshaking Consequently, the AP 105 must comply with a carrier's global mode system selection (GMSS), multi-mode packet data control (PKT), and reselection requirements. The AP 105 is also restricted to each RAT vendor's specific requirements and interfaces for registering and setting up calls on the RAT modem. Thus, the AP vendor is required to be familiar with the specific operation of each RAT modem, so as to perform interworking operations between them.

There are several drawbacks associated with these conventional multi-mode schemes. First, an AP controller (which controls the AP 105) is custom-tailored to each RAT vendor's call-flow sequence and, therefore, is not reusable or universal to all CDMA/LTE or other RAT vendor. In other words, the customized AP controller is usable only for the owner of the AP 105, and not universal or reusable for another AP vendor. As a result, conventional AP controllers are neither portable to different platforms nor operating systems (OS). This obstacle to portability also affects flexibly, insofar as conventional AP controllers cannot reside on other AP or RAT modem processors, which hinders reusability for different vendors' inter-process communication (IPC) frameworks. Second, due to this inflexibility, significant efforts are typically needed to incorporate new additional carrier or vendor requirements. Additionally, current solutions are not adaptable or reusable for new wireless RAT technologies. Third, conventional approaches do not provide for environments that do not have an AP 105, such as LTE/CDMA data cards or data monitoring devices, or different platforms, such as single-chip or multi-chip configurations.

Figure 2:
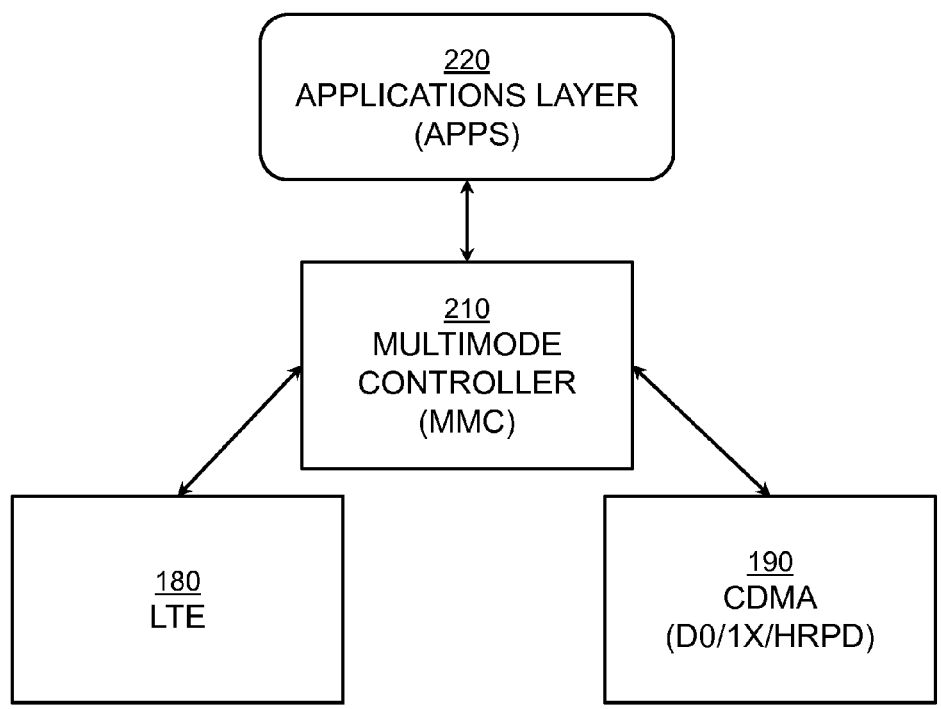
FIG. 2 is a block diagram showing one embodiment of a wireless device having a multi-mode controller (MMC).

Various embodiments of the invention overcome these drawbacks by providing a multi-mode controller (MMC) 210, such as that shown in FIG. 2. The MMC 210 provides an interface between the applications layer (APPS) 220 and various RAT technologies, such as LTE 180 and CDMA 190. By acting as the interface between the APPS 220 and the RATs (e.g., LTE 180 and CDMA 190), the MMC 210 provides flexibility and reusability that were previously unrealizable by the conventional AP 105. Furthermore, the MMC 210 permits portability to different platforms and different environments, thereby allowing for simpler incorporation of new additional carrier or vendor requirements. Additionally, the MMC 210 provides a faster time-to-market solution for multi-mode devices, which can be readily integrated into an existing vendor's RAT and application software with minimal alterations to the vendor's existing software. In other words, the MMC 210, for some embodiments, is a universal controller that is adaptable to different RATs without custom-tailoring the AP 105 for each new RAT or for each new change in the RAT.

Having generally described several embodiments that provide for multi-mode wireless communications, reference is now made in detail to the description of the embodiments as illustrated in the drawings. Specifically, FIGS. 3 through 6 show numerous embodiments of systems having a MMC controller, FIGS. 7A through 14 show several embodiments of processes that employ different permutations of the systems of FIGS. 3 through 6, and FIGS. 15A through 19C show several embodiments of application program interfaces (APIs) that are used in the processes of FIGS. 15A through 19C. While several embodiments are described in connection with these drawings, there is no intent to limit the disclosure to the embodiment or embodiments disclosed herein. On the contrary, the intent is to cover all alternatives, modifications, and equivalents.

Figure 3:
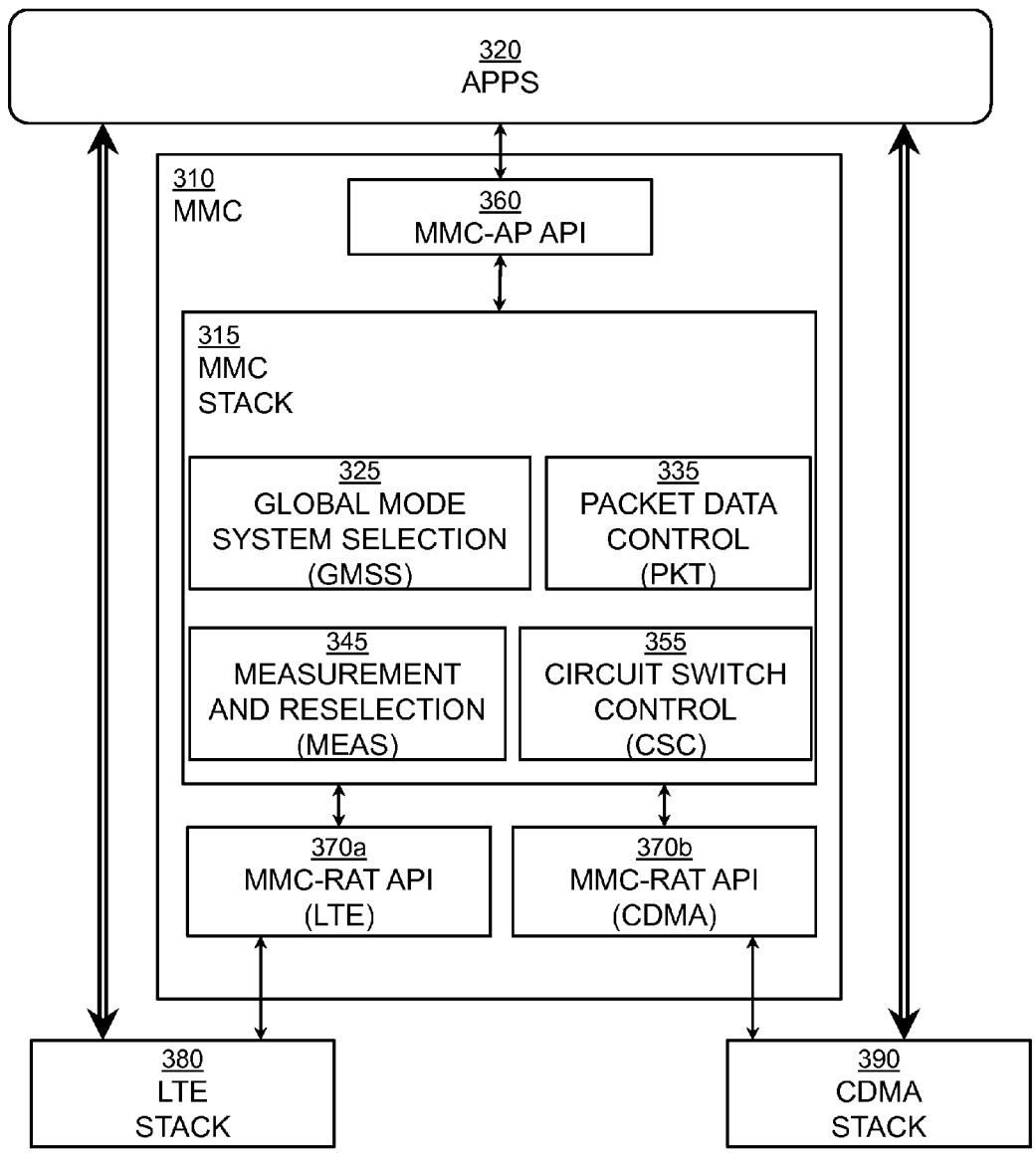
FIG. 3 is a block diagram showing one embodiment of a MMC protocol stack in an example embodiment of a wireless device.

With this in mind, FIG. 3 is a block diagram showing one embodiment of a MMC protocol stack 315 (also designated as an MMC stack 315) in an example embodiment of a wireless device. As shown in FIG. 3, the MMC stack 315 resides in an MMC 310 which, in turn, resides in the wireless device, thereby permitting the MMC 310 to control various aspects of the wireless device. The MMC 310 resides between an APPS 320 and different RAT stacks, such as, for example, a LTE stack 380 and a CDMA stack 390.

The MMC 315 is compatible with different RATs because the MMC stack 315 comprises several components that manage inter-technology operations between different RATs. Those components include a global mode system selection module (GMSS) 325, a packet data control module (PKT) 335, a measurement and reselection module (MEAS) 345, and a circuit switch control module (CSC) 355.

The GMSS 325 houses logic to perform global system selection based on user's configuration inputs, current network locations, and channel conditions. The GMSS 325 also implements carrier-specific requirements for global system selections. Specifically, the GMSS 325 searches for a network to be acquired and accessed based on a priority list. If a preferred, valid system on a RAT cannot be acquired, then the GMSS 325 advances to the next RAT from the list to be acquired. In one embodiment, FIGS. 15A through 15C (collectively, FIG. 15) show a set of APIs that perform the triggering of the RAT acquisition for specified 3rd generation partnership project (3gpp) or 3gpp2 global or stand-alone modes. Depending on the mode selected, a GMSS algorithm is executed to select the best available system to be acquired and validated. Once validated, the acquired RAT registers for packet service until there is a handoff to a better RAT or the registered RAT loses service. It should be noted that when there are RAT status changes, an indication report is also asynchronously sent and, thus, for some embodiments, the GMSS 325 takes further action to maintain system availability by triggering other preferred system acquisition or reselection based on various handoff criteria.

The MEAS 345 incorporates algorithms to perform measurements on non-active RAT systems. The MEAS 345 evaluates conditions and inputs to decide whether a reselection or handoff to another (preferably better) system should occur. Specifically, the MEAS 345 coordinates measurement requests from an active RAT to other non-active RATs. The MEAS 345 then consolidates the measurement results from the non-active RATs to the active RAT. If the reselection criteria are met, the MEAS 345 triggers a handoff from the current, active RAT to the better previously-non-active RAT. For the particular embodiment of FIG. 3, the MEAS 345 conducts reselections from LTE to CDMA (eHRPD (evolved high-rate packet data)/HRPD (high-rate packet data)/1× (1× standard)), or vice versa from CDMA to LTE, in both idle and active packet data connections. In addition, the MEAS 345 works closely with GMSS 325 to trigger system reselection when a system becomes unavailable through system loss. For some embodiments, FIGS. 16A through 16C (collectively, FIG. 16) show a set of APIs that handle measurement and reselection. FIG. 16 includes APIs for a current RAT to trigger measurement commands to another RAT while the current RAT is registered in an active state or an idle state. FIG. 16 also includes measurement commands from the MMC 310 to the current registered RAT while the other RAT is being registered. As such, the MMC 310 solicits measurement results and then runs the reselection algorithm for inter-RAT handoffs. When handoff criteria are met, the MMC 310 triggers the handoff from one RAT to the other RAT.

The PKT 335 handles procedures for registering, setting up, and releasing packet data call connections for each RAT. The PKT 335 is also responsible for maintaining continuity in packet service sessions when there is a handoff from one RAT to another. The PKT 335 maintains a packet data network (PDN) table and a quality-of-service (QOS) table for the packet service. The PKT 335 also sets up a default packet data bearer channel to the main PDN on the active RAT that is acquired. The PKT 335 also attaches the device to this PDN by registering its packet data service, thereby subsequently permitting user packet data to be transported between the device and the PDN. In addition to the default main PDN bearer setup, the PKT 335 also enables dedicated bearer setups for packet services that specify different levels of QOS with a QOS profile. For some embodiments, FIGS. 17A and 17B (collectively, FIG. 17) show a set of APIs for packet data service control in a RAT. FIG. 17 includes a default bearer packet data path setup. Further, FIG. 17 includes a dedicated packet data path setup for services that require quality-of-service (QOS) differentiation. FIG. 17 also includes a bearer disconnection and detach of a packet data path once the data path is released (e.g., as part of the handoff procedure). FIG. 17 further includes APIs for controlling data connection management during handoff events (e.g., data suspend, data resume, disable (if handoff is successful), etc.).

The CSC 355 is responsible for handling the circuit switch setup in the multi-mode device (for single radio configurations and/or multiple radio configurations) where simultaneous voice and LTE (SVLTE) or other RATs are supported. The CSC 355 can be activated for a single radio configuration, where the user desires to fall back to circuit switched services in addition to packet data services. The CSC 355 also handles voice call continuity (VCC) handoffs between voice-over-IP (VoIP, over IMS packet data service on any RAT) and CDMA 1× circuit switch voice calls. The CSC 355 includes message routing for generic circuit switch notification application (GCSNA) protocol, which encapsulates the CDMA 1× layer3 message to be transported across any RAT. The CSC 355 further handles explicit registrations and de-registrations on applicable RATs due to changes in services available. For some embodiments, FIG. 18 shows a set of APIs that handle CDMA 1× circuit switch setup and release for single radio configurations and/or multiple radio configurations.

Insofar as the MMC 310 interfaces to the different components, the MMC 310 also comprises various application program interface (API) modules. For example, since the MMC 310 interfaces to the APPS 320, the MMC 310 comprises an MMC-AP API 360 that sends and receives commands between the MMC stack 315 and the APPS 320. Also, since the MMC 310 interfaces to the LTE stack 380, the MMC 310 also comprises an MMC-RAT API 370a that permits the MMC stack 315 to send and receive commands to and from the LTE stack 380, thereby permitting the APPS 320 to exchange data with the LTE stack 380. The data lines are shown as double-lined arrows in the drawings. Similarly, because the MMC 310 interfaces to the CDMA stack 390, the MMC 310 comprises another MMC-RAT API 370b, that allows the MMC stack 315 to send and receive commands between the MMC stack 315 and the CDMA stack 390, thereby providing for data communication between the CDMA stack 390 and the APPS 320.

Each of the MMC-RAT API modules 370a, 370b (collectively, 370) comprises a set of easy-to-use, universal APIs for the general control of each wireless RAT protocol stack. Basically, these functions include global system selection and acquisition, measurement control, reselection to another RAT, packet call registration and setup, circuit switch fallback, and voice call handoff continuity. Each of the MMC-RAT API 370 is adaptable and generic to all RATs. An instance of the MMC-RAT API 370 is created to serve each RAT that is being integrated in the multi-mode device. Thus, it should be understood by those skilled in the art that, in the particular embodiment of FIG. 3, the two (2) MMC-RAT API instances 370 are created for connectivity to the LTE stack 380 and CDMA stack 390.

The MMC-AP API 360 is a set of universal APIs that interfaces with the APPS 320 (including stacks for Internet Protocol (IP) multimedia subsystem (IMS), voice-over-IP (VoIP), transmission control protocol over IP (TCP/IP), user interfaces (UIs), and other applications). As such, the MMC-AP API 360 sets up different 3gpp/3gpp2 LTE/CDMA/Global hybrid and multi-modes. Furthermore, the MMC-AP API 360 provides triggers for packet service from the various applications, and also provides interfaces to configure the global system selection tables, packet data network (PDN) tables, and quality-of-service (QOS) tables for packet data service. Effectively, through the proposed MMC 310, the UI/Applications layer (APPS 320) is transparent to the underlying packet service transport layer control through the different RATs. In other words, details of each RAT acquisition and registration are hidden from the APPS 320, and reselection among the RATs for the best packet service coverage is also hidden from the APPS 320. The MMC-AP API 360 controls power-up and power-down of the MMC 310 which, in turn, controls power-up and power-down of the RAT connection. Additionally, the MMC 310 reports current network status or current service status to the APPS 320 asynchronously through the MMC-AP API 360. For some embodiments, FIGS. 19A through 19C (collectively, FIG. 19) show a set of APIs that allow the APPS 320 to manage the device's packet call control, including main packet service call setup and release. The APIs of FIG. 19 also initiate the dedicated bearer packet path for application services that require QOS differentiation.

Figure 4:
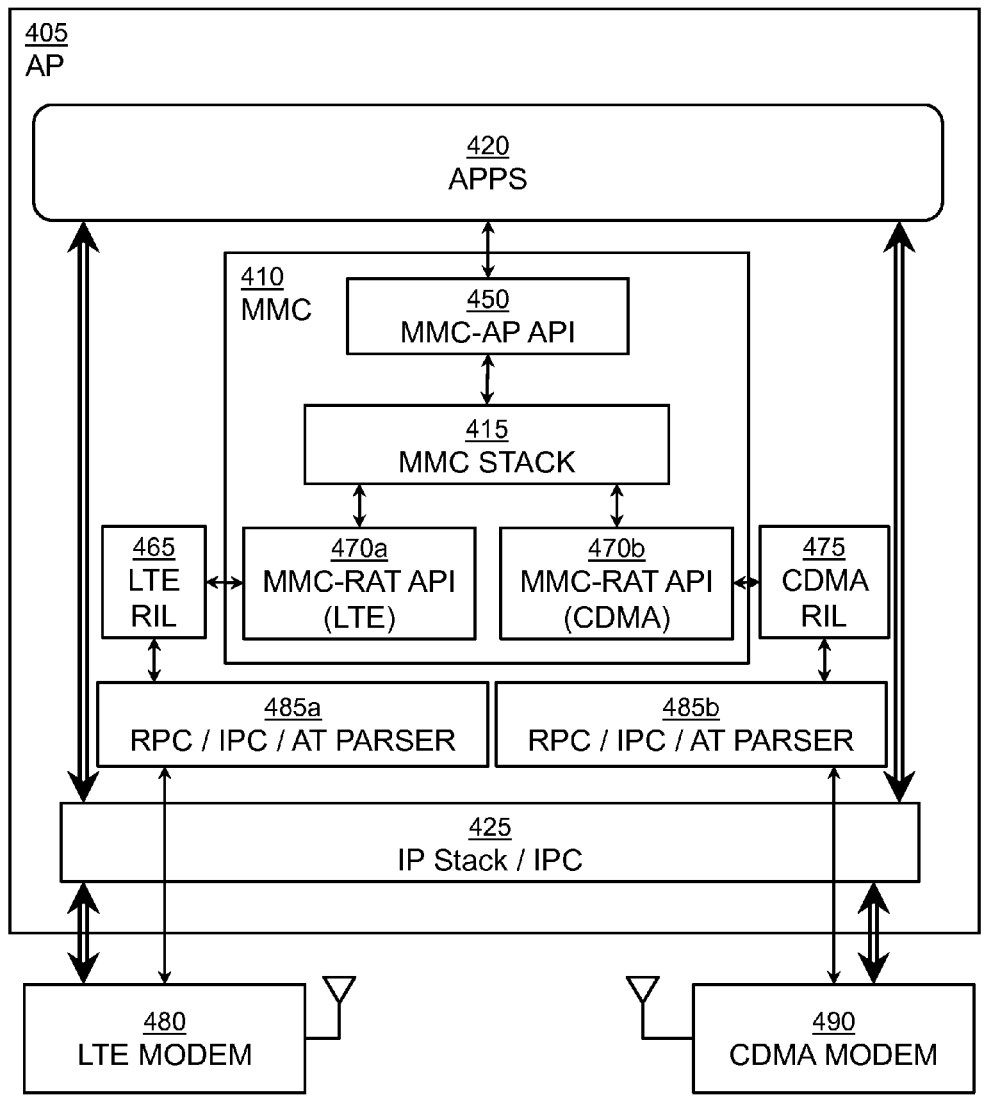
FIG. 4 is a block diagram showing another embodiment of a MMC protocol stack in another example embodiment of a wireless device.

With these functions of the GMSS 325, the PKT 335, the MEAS 345, and the CSC 355 in mind, attention is turned to FIG. 4, which is a block diagram showing another embodiment of a MMC 410 in another example embodiment of a wireless device. Specifically, FIG. 4 shows the MMC 410 residing in an AP 405 of a multi-mode device that employs, by way of example, LTE and CDMA. Thus, similar to the embodiment of FIG. 3, the embodiment of FIG. 4, the AP 405 (within the multi-mode device) comprises the APPS 420, the MMC 410 with the MMC stack 415, the MMC-AP API 450, the MMC-RAT API (LTE) 470a, and the MMC-RAT API (CDMA) 470b. Additionally, the AP 405 comprises an IP-stack/IPC 425, a LTE radio interface layer (RIL) 465, and a CDMA RIL 475.

The APPS 420 exchange data with the IP-stack/IPC 425 (with the data lines being shown as double-lined arrows), which is responsible for data transmission and reception with external RAT modems, such as, for example, a LTE modem 480 and a CDMA modem 490. To this extent, the MMC 410 interfaces with the LTE RIL 465 through the MMC-RAT API (LTE) 470a, and the MMC 410 also interfaces with the CDMA RIL 475 through the MMC-RAT API (CDMA) 470b. The MMC 410 interfaces to the APPS 420 through the MMC-AP API 450.

The LTE RIL 465 is a typical wrapper layer for interfacing with the LTE modem stack on the LTE modem 480. As such, an LTE vendor can easily interface with the MMC 410 through the MMC-RAT API (LTE) 470a to perform system selection, handoffs, and packet service operations using LTE. The CDMA RIL 475 is a typical wrapper layer for interfacing with the CDMA modem stack on the CDMA modem 490. Thus, the CDMA vendor can easily interface with the MMC 410 through the MMC-RAT API (CDMA) 470b to perform system selection, handoffs, and packet service operations using CDMA. As one can appreciate, while LTE and CDMA are expressly recited to provide a clearer example, the MMC-RAT API 470 can be implemented for different RATs, thereby making the AP 405 more flexible than the AP 105 in conventional multi-mode devices.

Since the application and framework layer on the AP 405 can easily interface with the MMC-AP API 450 to control the power-up and power-down of each RAT and to start or stop packet data services, the proposed MMC 410 is extremely portable and independent of platform and operating system (OS). In some specific embodiments, the MMC 410 resides on the AP 405 that runs on Andriod™ OS, Windows® OS, or other known OS. The MMC 410 is also portable to either the CDMA or LTE or other RAT modem processors, which are typically embedded ARM (advanced RISC (reduced instruction set computer) machine) processors running real-time Nucleus RTOS (real-time operating system) or other OS.

Figure 5:
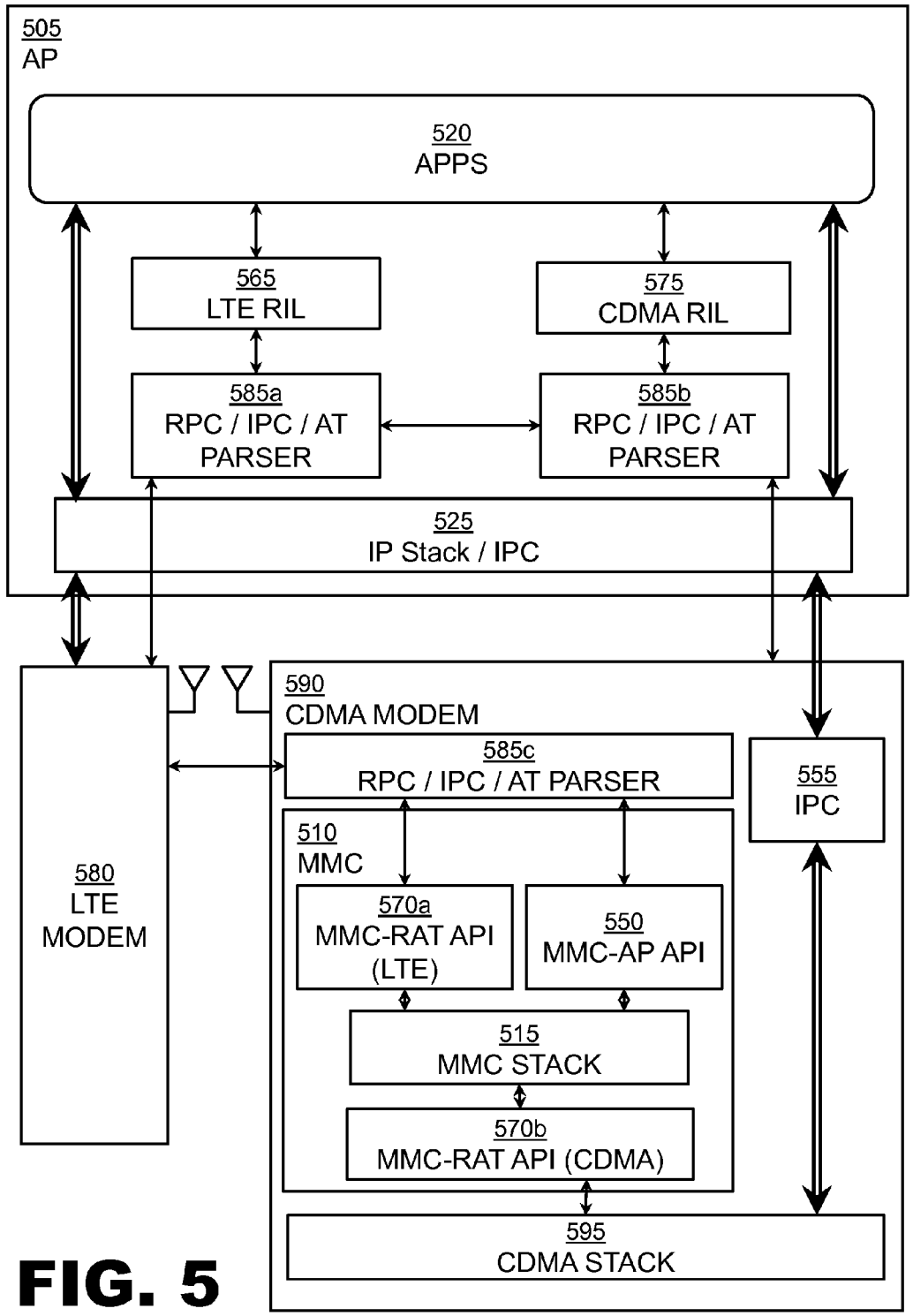
FIG. 5 is a block diagram showing one embodiment of a MMC protocol stack in an example embodiment of a code-division multiple access (CDMA) modem processor.

FIG. 5 is a block diagram showing one embodiment of a MMC protocol stack in an example embodiment of a code-division multiple access (CDMA) modem processor. In particular, the embodiment of FIG. 5 shows the MMC 510 residing on a CDMA modem processor 590. In the architecture of FIG. 5, the MMC 510 communicates with other RATs (e.g., LTE) directly when there is a direct connection between the two RATs. The MMC 510 establishes this direct connection using underlying transport mechanism such as remote procedure calls (RPC), or other proprietary IPC schemes, or AT (attention) commands (also known as Hayes commands) through a RPC/IPC/AT (CDMA) parser 585c.

In the absence of a direct connection, the MMC 510 communicates with the AP 505 through both the MMC-AP API 550 and MMC-RAT API (CDMA) 570b, with the AP 505 routing messages from the MMC-RAT API (CDMA) 570b to the other MMC-RAT API (LTE) 570a.

As can be seen from the embodiment of FIG. 5, since the MMC 510 resides on the CDMA modem 590, the AP 505 does not include the MMC. However, the AP 505 comprises the APPS 520, the LTE RIL 565, the CDMA RIL 575, the RPC/IPC/AT parsers 585a, 585b (one for LTE, and another for CDMA).

The MMC 510 is independent of the underlying transport mechanism between the AP, LTE, and CDMA. Also, the MMC-RAT API 570 and MMC-AP API 550 interface transparently with the different types of inter-processor transport layers, including RPC, proprietary IPC protocols, or AT command parsers. A thin wrapper layer is used for adapting to these different transport schemes. Thus, as shown in FIG. 5, with the MMC 510 residing on the CDMA modem 590, the LTE or AP can interface with the MMC APIs 550, 570a, 570b transparently through the underlying RPC/IPC/AT parser communication methods. Due to the independence of the underlying transport mechanism, the MMC 510 is upgradable and extendable to incorporate requirements from new carriers or vendors. Furthermore, the independence of the transport mechanism also permits modification of existing vendor requirements. Specifically, each network carrier has its own requirements for global mode system selection and packet service control. The measurement and reselection algorithms are largely compliant to 3gpp and 3gpp2 standards, but carriers or vendors may have specific requirements to upgrade or enhance these algorithms. The MMC 510 readily accommodates upgrades or modifications to different vendor or carrier requirements.

As demonstrated by the flexibility shown in FIG. 4 and FIG. 5, the MMC 410, 510 provides a universal solution for all wireless RATs, including LTE, CDMA (eHRPD/HRPD/1x), global system for mobile (GSM) communications, Wi-Fi™ wireless protocols, IEEE 802.15 communications standards, Bluetooth® wireless protocols, etc. Core modules of the MMC 410, 510 are upgradable and expandable to include RAT-specific requirements for systems selections, measurements, handoffs, packet service controls, etc. Thus, the MMC-RAT API 470, 570 is instantiated so that the MMC 410, 510 can be interfaced with each RAT.

Figure 6:
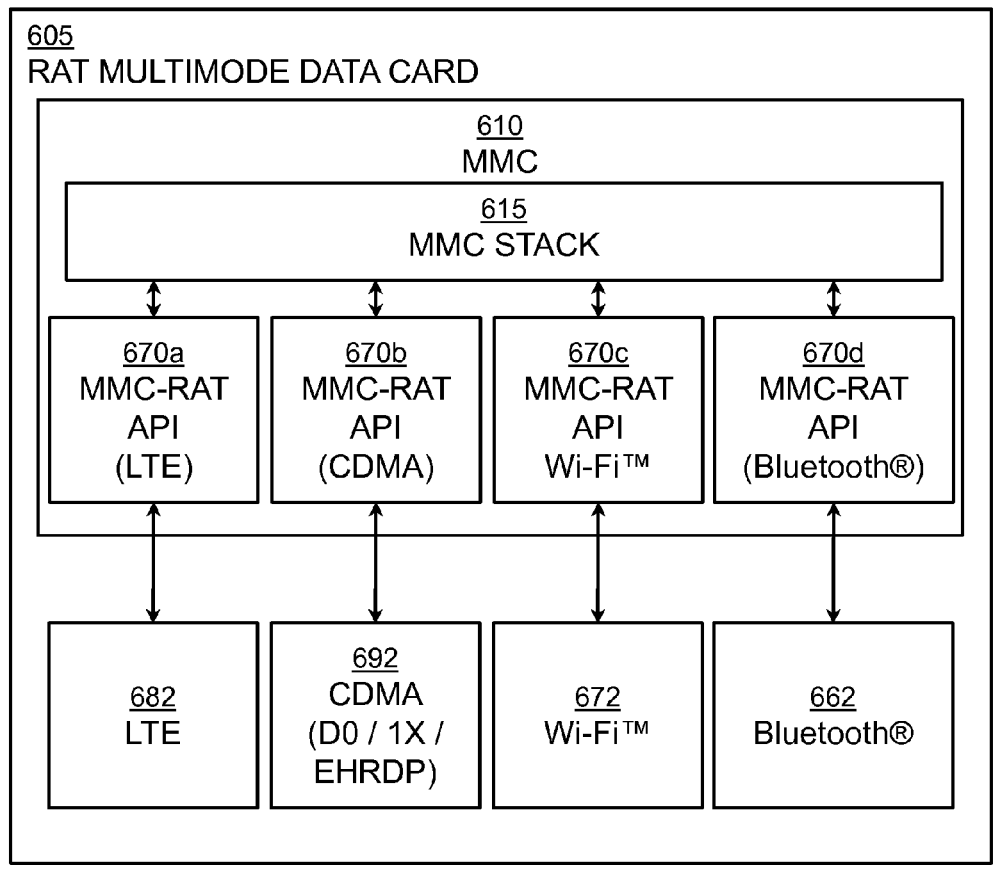
FIG. 6 is a block diagram showing one embodiment of a MMC protocol stack in an example embodiment of a data card with multiple radio access technologies (RATs) on a single chip.

To further demonstrate the flexibility and portability of the MMC, FIG. 6 shows one embodiment of a MMC 610 in an example embodiment of a data card 605 with multiple RATs on a single chip. By way of example, the multiple RATs of FIG. 6 include LTE 682, CDMA 692, Wi-Fi™, and Bluetooth®. Thus, as shown in FIG. 6, the data card 605 comprises the MMC 610 with the MMC stack 615, with the MMC 610 comprising multiple MMC-RAT APIs, namely, one for each RAT (MMC-RAT API (LTE) 670a, MMC-RAT API (CDMA) 670b, MMC-RAT API (Wi-Fi™) 670c, MMC-RAT API (Bluetooth®) 670d (collectively, 670)). In other words, the MMC 610 instantiates multiple MMC-RAT APIs 670 for each type of communication. This permits the MMC 610 to control and route packet data service between all of the RATs. Thus, as shown in FIGS. 4, 5, and 6, the MMC 410, 510, 610 supports a large variety of wireless configurations and can be implemented on: (a) single chip devices or multi-chip devices; and (b) different wireless devices, such as smartphones, tablets, netbooks, data monitoring devices, and data cards.

Figure 7A:
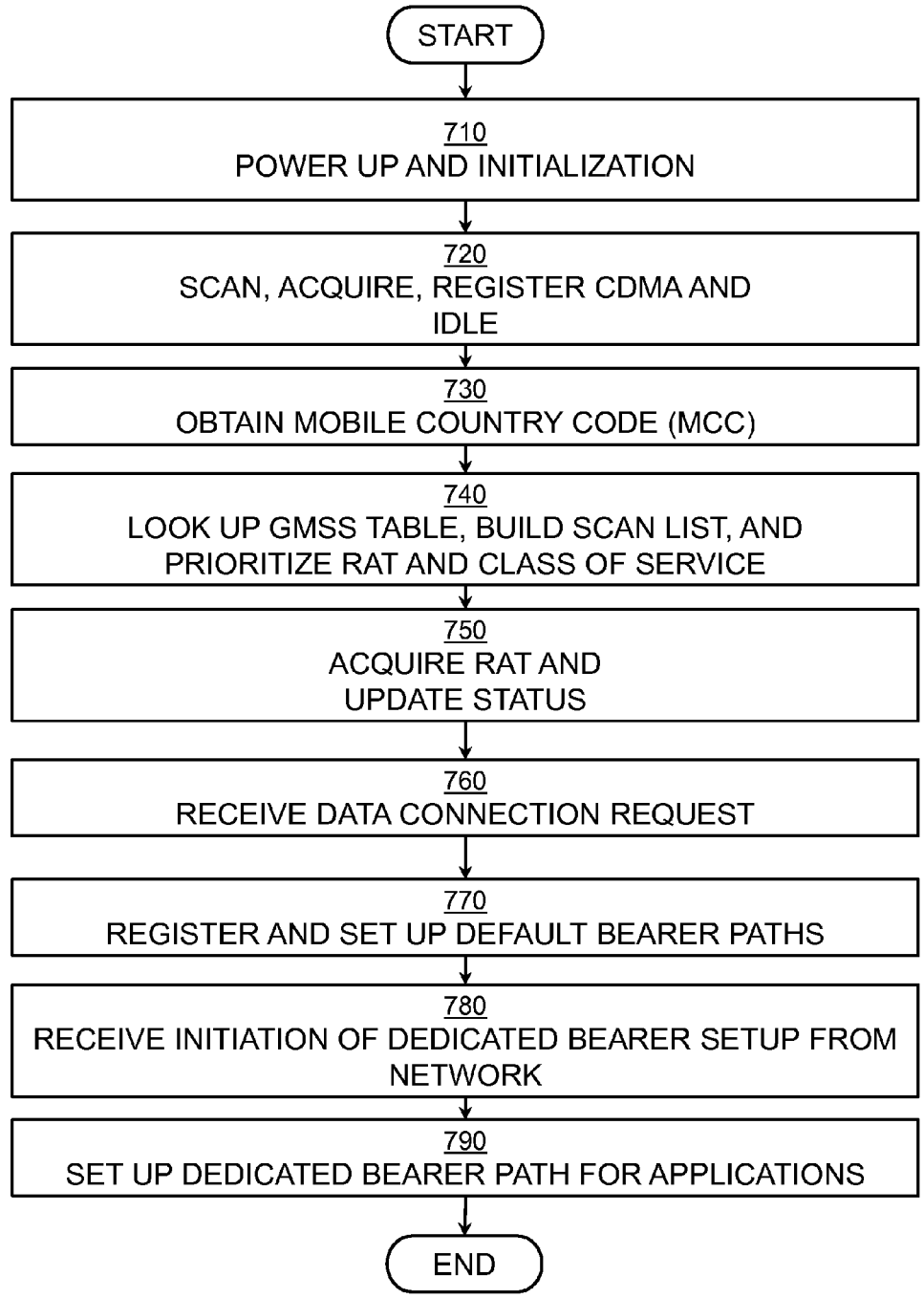
FIG. 7A is a flowchart showing one embodiment of a process for global mode system selection and long-term evolution (LTE) packet data registration.
Figure 7B:
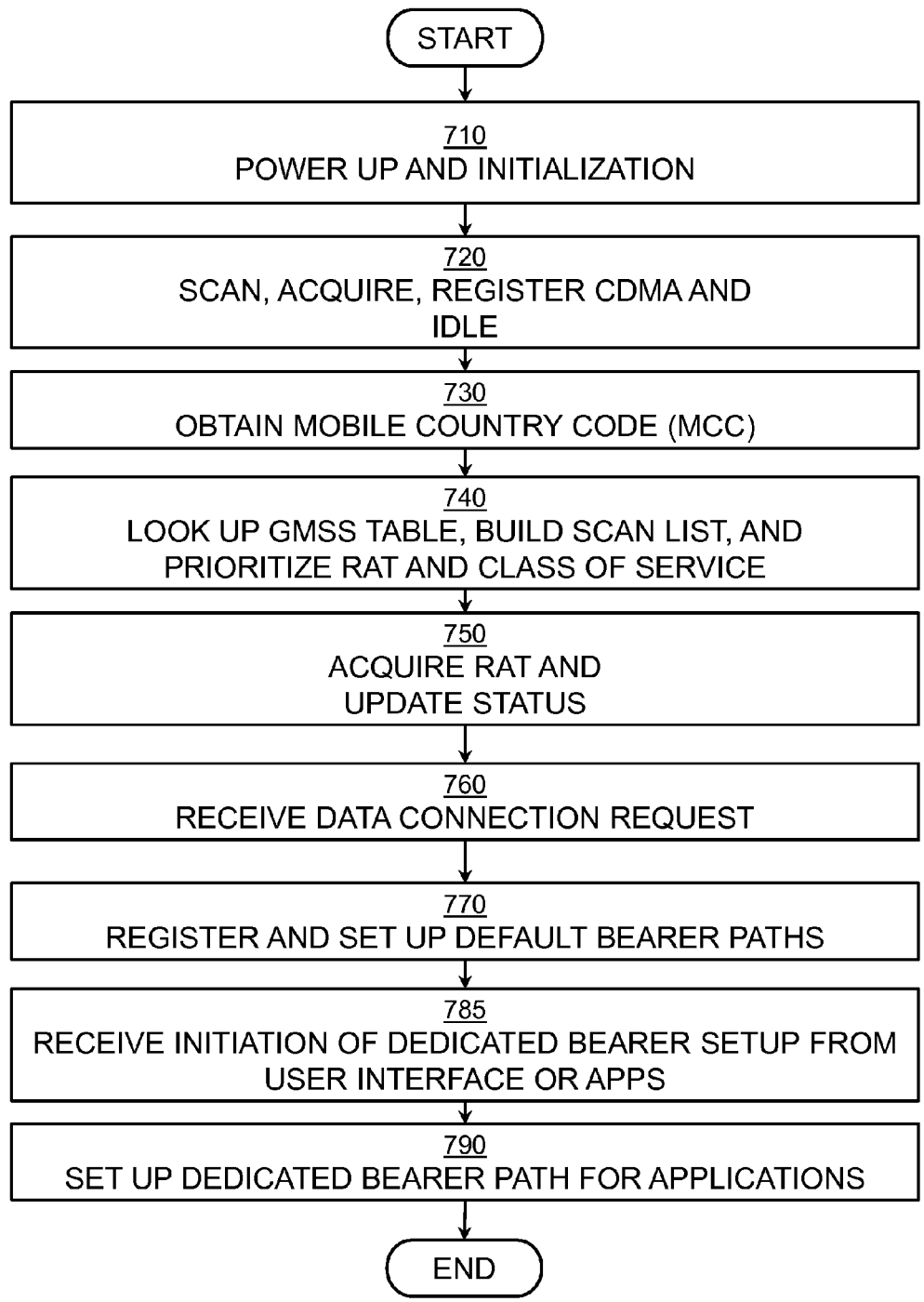
FIG. 7B is a flowchart showing another embodiment of a process for global mode system selection and long-term evolution (LTE) packet data registration.
Figure 8:
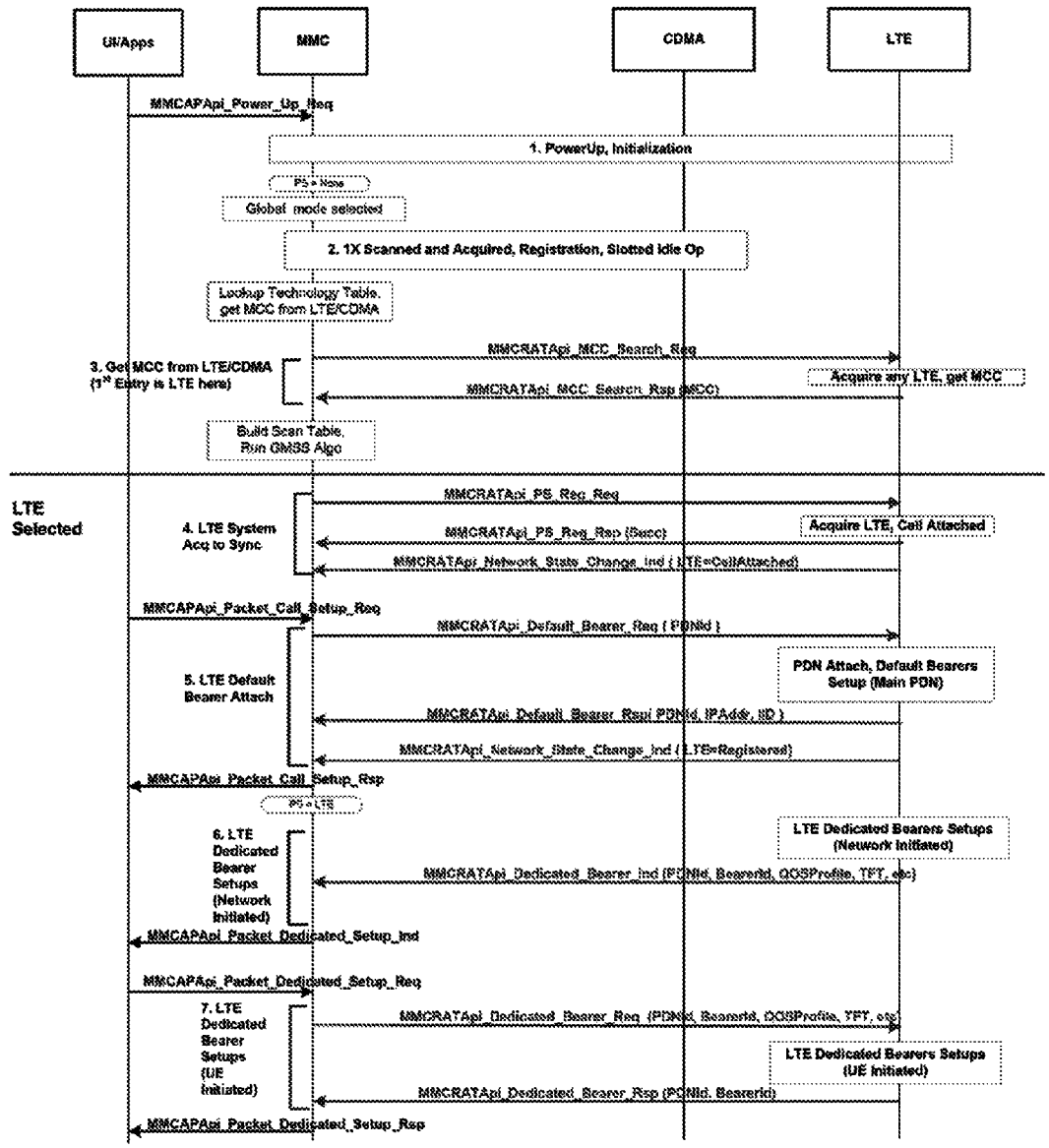
FIG. 8 is a data flow diagram showing in greater detail one embodiment of the processes of FIGS. 7A and 7B.

FIGS. 7A and 7B are flowcharts showing several embodiment of a process for global mode system selection and long-term evolution (LTE) packet data registration, while FIG. 8 is a data flow diagram showing in greater detail one embodiment of the processes of FIGS. 7A and 7B. For clarity, the embodiments of FIGS. 7A, 7B, and 8 show the data flow between the MMC and both the LTE and CDMA components using example application program interfaces (APIs) that are described with reference to the tables in FIGS. 15A through 19C. Recall: (a) FIG. 15 shows tables of APIs for global mode system selection (GMSS); (b) FIG. 16 shows tables of APIs for measurement and reselection (MEAS); (c) FIG. 17 shows tables of APIs for packet data control (PKT); (d) FIG. 18 shows a table of APIs for circuit switch control (CSC); and (e) FIG. 19 shows tables of APIs for controlling an application processor (AP).

The embodiment of the process in FIGS. 7A and 8 begins with a power-up and initialization 710 of the MMC. For this, the APPS sends a MMCAPapi_Power_Up_Req to the MMC, which powers up the MMC and initializes the device for CDMA and LTE. At this step of the process, there is no registered packet service, and the global mode is selected. Next, the process scans, acquires, and registers 720 the CDMA 1x stack for voice services and then remains in an idle mode. The MMC then attempts to obtain 730 a mobile country code (MCC) from any network in its current location by acquiring a RAT that is in the vicinity of the mobile device. For this embodiment, the MMC obtains 730 the MCC from an LTE RAT using MMCRATapi_MCC_Search_Req, to which the LTE responds with MMCRATapi_MCC_Search_Rsp (MCC).

The MMC then looks up 740 its GMSS tables, builds a scan list based on the carrier's GMSS algorithm, and prioritizes the RAT and its class of service. Thereafter, the MMC acquires 750 the RAT and updates its status. This is done by the MMC sending MMCRATapi_PS_Reg_Req to the LTE, thus acquiring the LTE, attaching the cell, and returning confirmation through MMCRATapi_PS_Reg_Resp (Success) and MMCRATapi_Network_State_Change_Ind (LTE=CellAttached).

The process then receives 760 a data connection request when the APPS 320 sends to the MMC MMCAPapi_Packet_Call_Setup_Req. At this point, the MMC registers 770 and sets up default bearer paths. For some embodiments, the MMC sends to the LTE a MMCRATapi_Default_Bearer_Req (PDNId), which attaches the PDN and sets up the default bearer path to the main PDN. The LTE returns MMCRATapi_Default_Bearer_Rsp (PDNId, IPAddr, IId) and MMCRATapi_Network_State_Change_Ind (LTE=Registered). Once the default bearer paths are registered 770 and set up, the process can either receive 780 (FIG.

7A) an initiation of a dedicated bearer setup from the LTE, or the process can receive 785 (FIG. 7B) an initiation of a dedicated bearer setup from the APPS.

The initiation from the LTE is received 780 (FIG. 7A) by the MMC through MMCRATapi_Dedicated_Bearer_Ind (PDNId, BearerId, QOSProfile, TFT, etc.), at which point the MMC sets up 790 the dedicated bearer path by sending to the APPS a MMCAPApi_Packet_Dedicated_Setup_Ind.

Alternatively, the initiation from the APPS is received 785 (FIG. 7B) through MMCAPApi_Packet_Dedicated_Setup_Req, at which point the MMC sets up 790 the dedicated bearer path by sending MMCAPApi_Dedicated_Bearer_Req (PDNId, BearerId, QOS Profile, TFT, etc.) to the LTE. The LTE sets up the dedicated bearer paths and returns MMCRATApi_Dedicated_Bearer_Rsp (PDNId, BearerId) to the MMC. The MMC then sends MMCAPApi_Packet_Dedicated_Setup_Rsp to the APPS.

Figure 9:
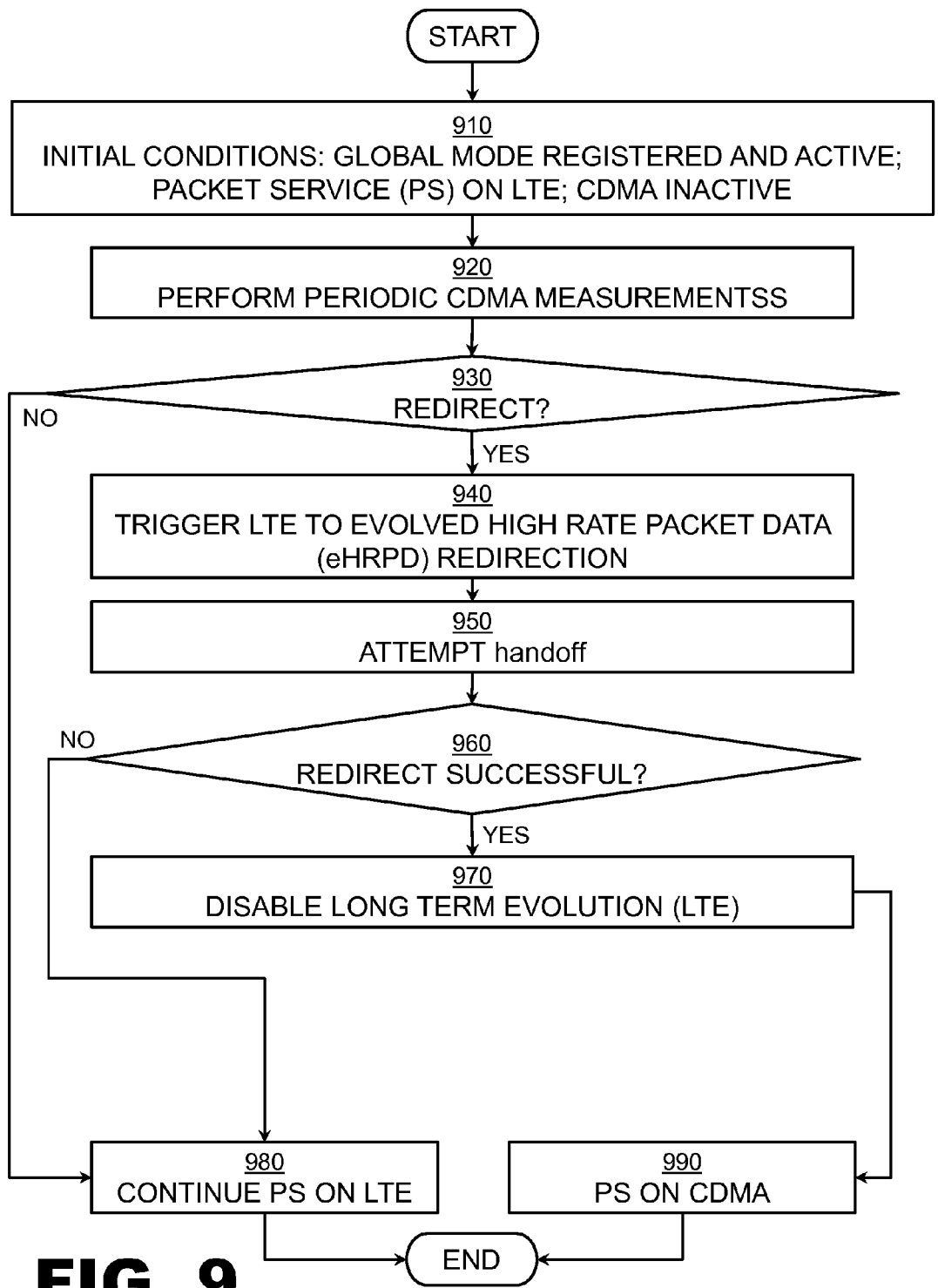
FIG. 9 is a flowchart showing one embodiment of a process for performing a system redirect.
Figure 10:
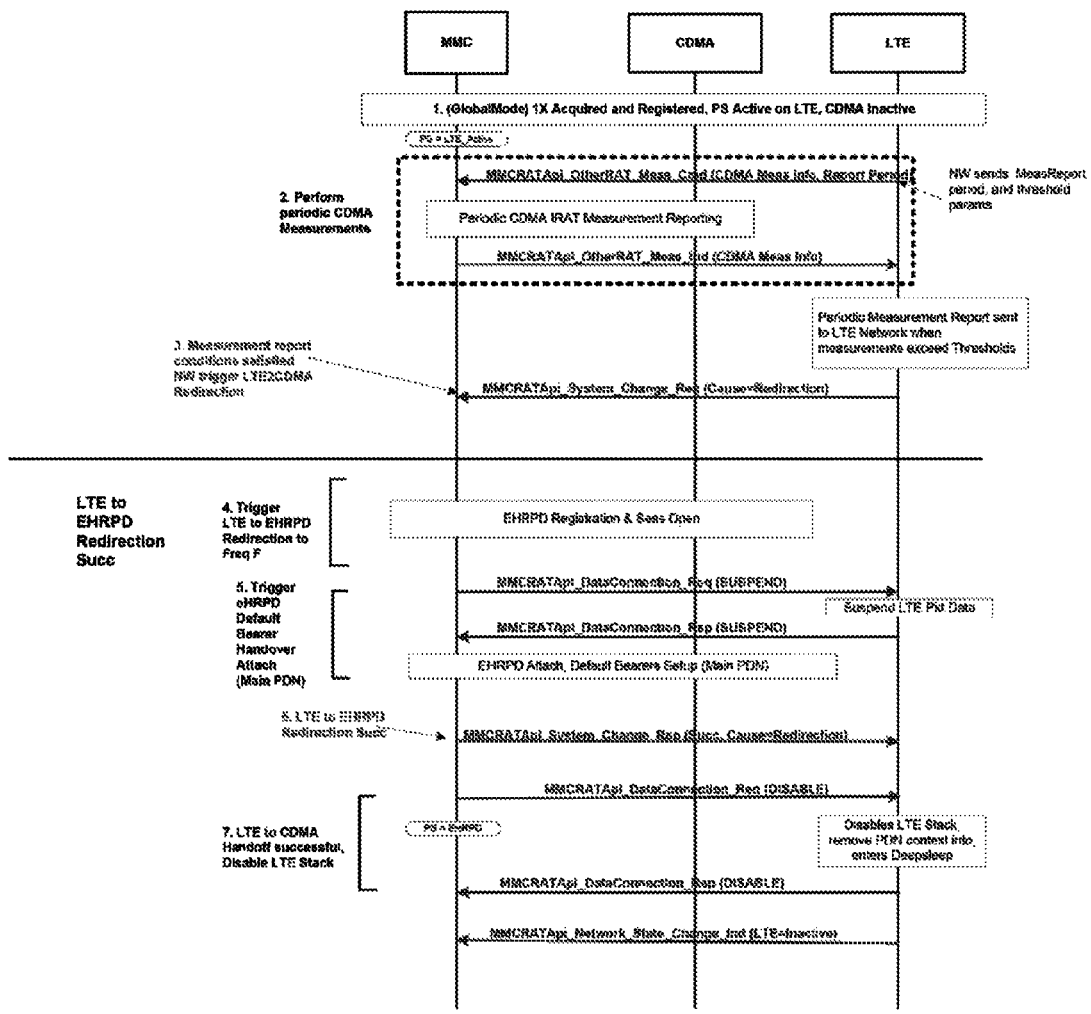
FIG. 10 is a data flow diagram showing in greater detail one embodiment of the process of FIG. 9.

FIG. 9 is a flowchart showing one embodiment of a process for performing a system redirect, while FIG. 10 is a data flow diagram showing in greater detail one embodiment of the process of FIG. 9. As shown in FIGS. 9 and 10, the initial conditions 910 of the process are: (a) global mode is registered and active; (b) packet service (PS) is active on LTE; and (c) CDMA is inactive. With these initial conditions, the process performs 920 periodic CDMA measurements by receiving MMCRATApi_OtherRAT_Meas_Cmd (CDMA_Meas_Info, Report_Period) from the LTE and sending to the LTE MMCRATApi_OtherRAT_Meas_Ind (CDMA_Meas_Info). Specifically, periodic measurement reports are sent to the LTE by the MMC when measurements exceed predefined thresholds.

The process then determines 930 whether or not to trigger redirection. Redirection is triggered when the LTE sends MMCRATApi_System_Change_Req (Cause=Redirection) to the MMC, which indicates that measurement report conditions are satisfied, thereby triggering LTE to CDMA redirection. So, as shown in FIG. 9, if there is no redirect triggered, then the PS continues 980 on LTE. On the other hand, when the measurement conditions for redirect are met, the process triggers 940 redirection from LTE to CDMA (eHRPD). This is done by registering eHRPD and opening a session. The process then attempts 950 a handoff from LTE to CDMA with the MMC sending to the LTE MMCRATApi_DataConnection_Req (Suspend), at which point the LTE suspends its PS and returns MMCRATApi_Data_Connection_Rsp (Suspend).

The process then determines 960 whether there is a successful handoff. If there is no successful handoff, then the PS continues 980 on LTE. However, if there is a successful handoff, then the MMC sends MMCRATApi_System_Change_Rsp (Success, Cause=Redirection) to the LTE. Thereafter, the process disables 970 the LTE and begins PS 990 on CDMA. The MMC disables the LTE by sending to the LTE MMCRATApi_DataConnection_Req (Disable), resulting in the LTE disabling its LTE stack, removing PDN context information, and entering idle mode. The LTE then sends to the MMC MMCRATApi_DataConnection_Rsp (Disable) and MMCRATApi_Network_State_Change_Ind (LTE=Inactive), which completes the handoff so that the device continues its PS using CDMA (eHRPD).

Figure 11:
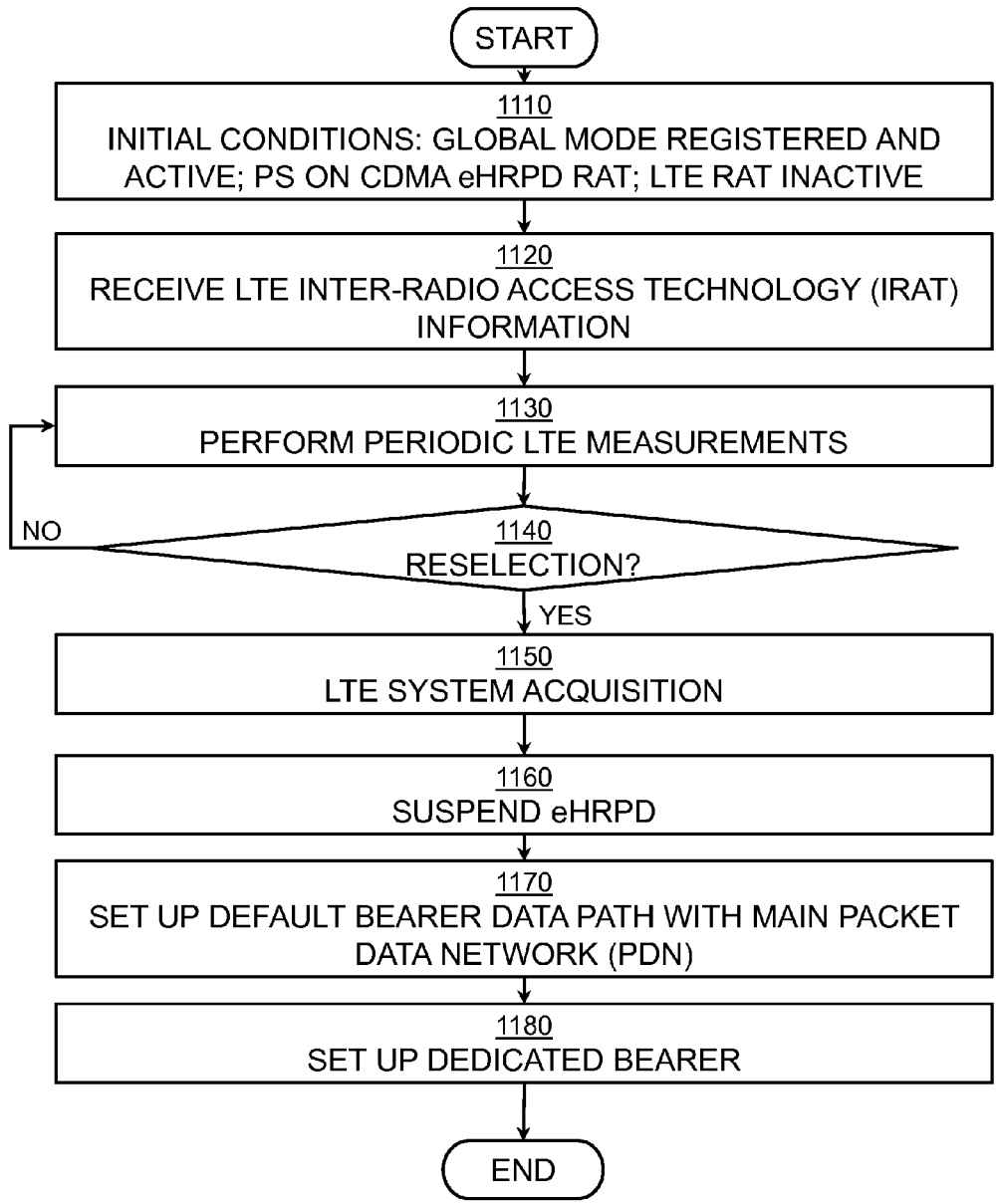
FIG. 11 is a flowchart showing one embodiment of a process for performing a system reselection.
Figure 12:
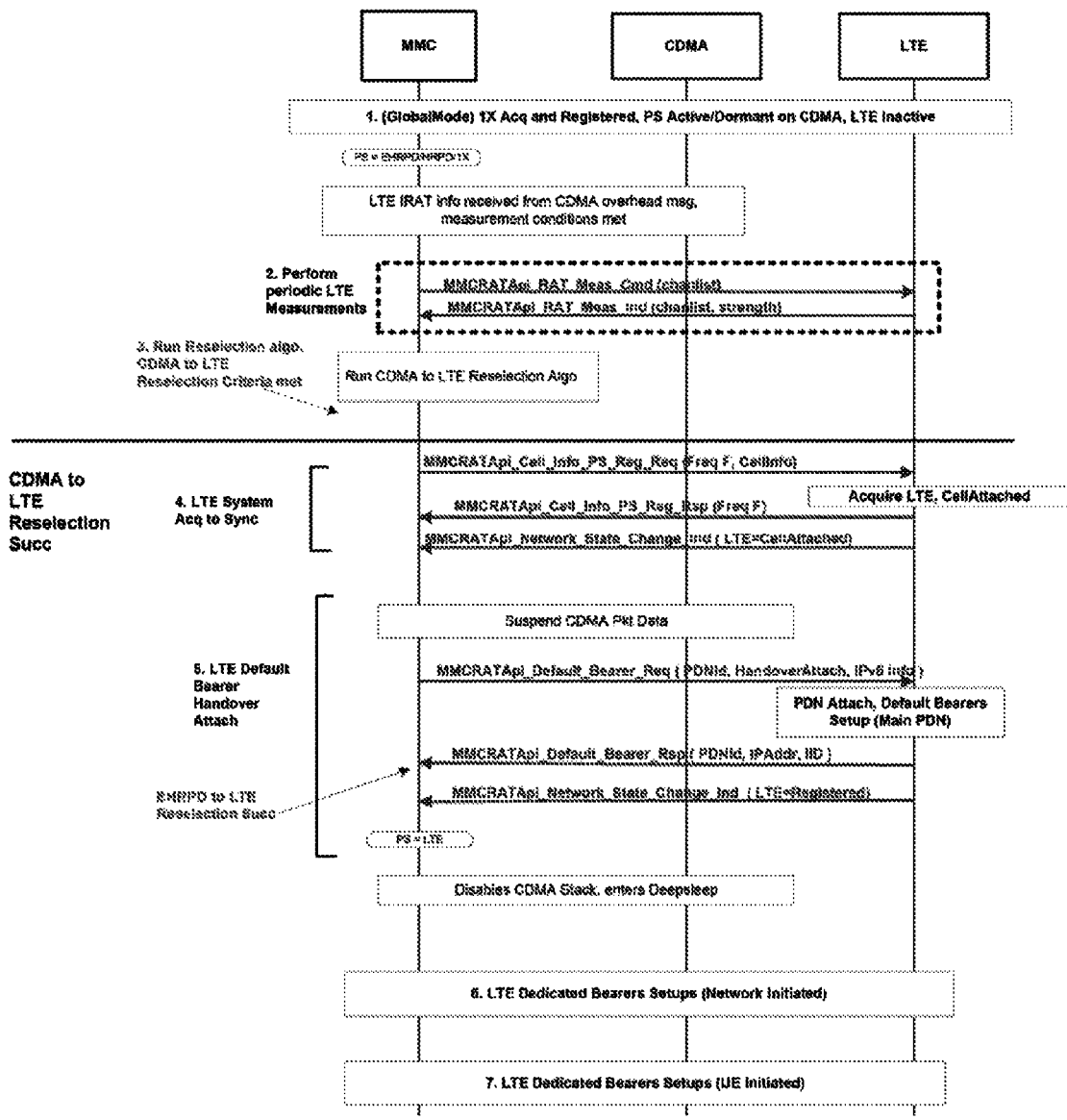
FIG. 12 is a data flow diagram showing in greater detail one embodiment of the process of FIG. 11.

FIG. 11 is a flowchart showing one embodiment of a process for performing a system reselection, while FIG. 12 is a data flow diagram showing in greater detail one embodiment of the process of FIG. 11. As shown in FIGS. 11 and 12, the initial conditions 1110 of this embodiment of the process are: (a) global mode is registered and active; (b) packet service (PS) is active on CDMA (eHRPD); and (c) LTE RAT is inactive. With these initial conditions, the process receives 1120 LTE inter-RAT (IRAT) information from CDMA overhead messages. Next, the process performs 1130 periodic LTE measurements. This is done by the MMC sending MMCRATApi_RAT_Meas_Cmd (ChanList) to the LTE and receiving from the LTE MMCRAT_Api_RAT_Meas_Ind (ChanList, Strength). The process next determines 1140 whether or not reselection criteria are met, and, if the reselection criteria are not met, then the process continues to perform 1130 periodic LTE measurements.

If, however, the reselection criteria are met, then the process runs the CDMA to LTE reselection algorithm and acquires 1150 the LTE. The MMC acquires 1150 the LTE by sending MMCRATApi_Cell_Info_PS_Reg_Req (Freq_F, CellInfo) to the LTE, at which point the LTE attaches the cell and returns both MMCRATApi_Cell_Info_PS_Reg_Rsp (Freq_F) and MMCRATApi_Network_State_Change_Ind (LTE=CellAttached) to the MMC, and the process suspends 1160 CDMA (eHRPD) packet data.

At this point, the process sets up 1170 the default bearer path with the main PDN. This is initiated when the MMC sends MMCRATApi_Default_Bearer_Req (PDNId, HandoverAttach, IPv6_Info) to the LTE. The LTE then attaches the PDN, sets up the default bearers to the main PDN and returns MMCRATApi_Default_Bearer_Rsp (PDNId, IPAddr, IId) and MMCRATApi_Network_State_Change_Ind (LTE=Registered) to the MMC. Thereafter, the PS is on LTE and the CDMA stack is disabled, with the LTE sending to the MMC MMCRATApi_DataConnection_Rsp (Disable) and MMCRATApi_Network_State_Change_Ind (LTE=Inactive). From here, the process sets up 1180 dedicated bearer paths similar to that shown in steps 780 (FIG. 7A) or 785 (FIG. 7B).

Figure 13:
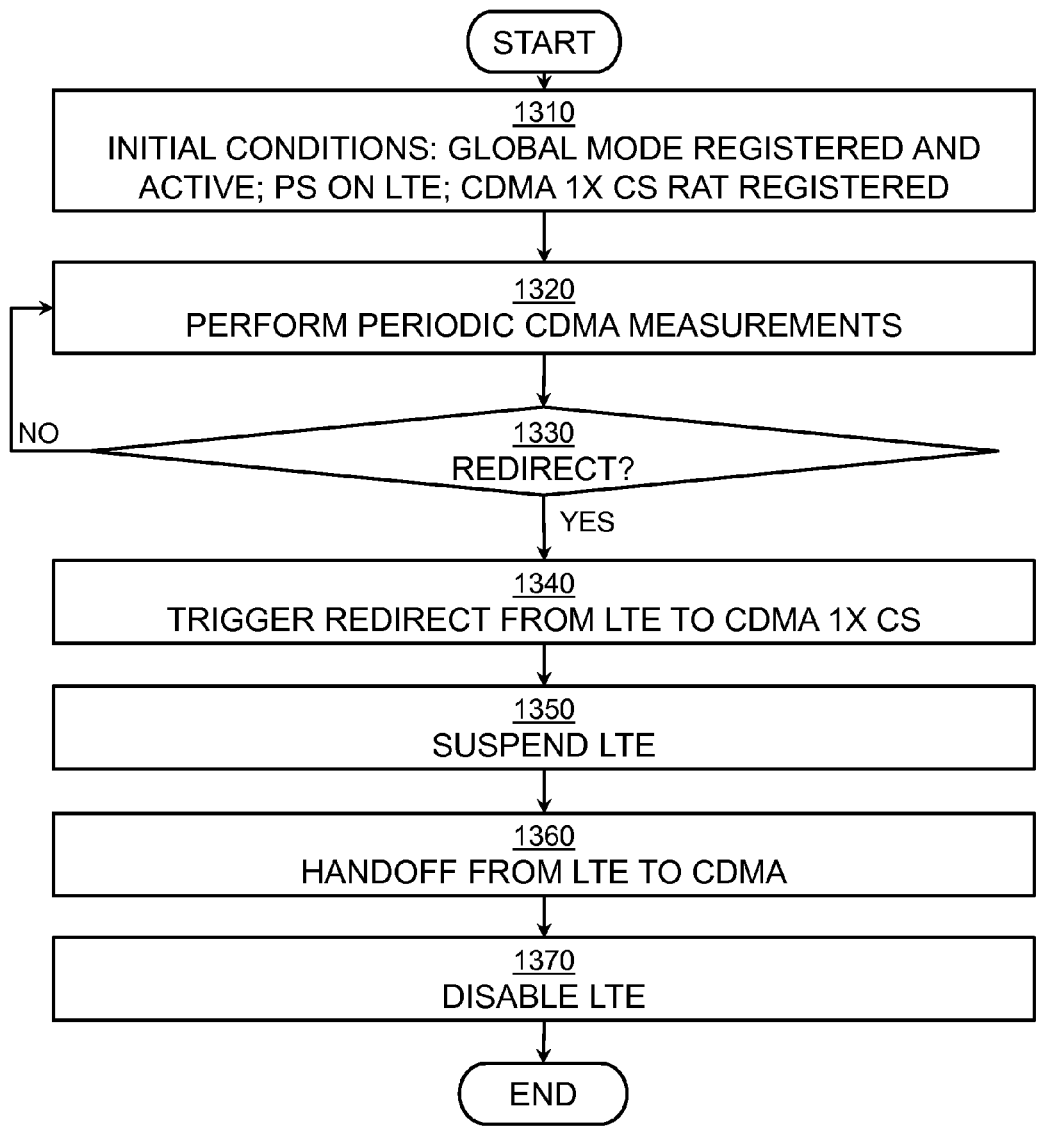
FIG. 13 is a flowchart showing another embodiment of a process for performing a system redirect.
Figure 14:
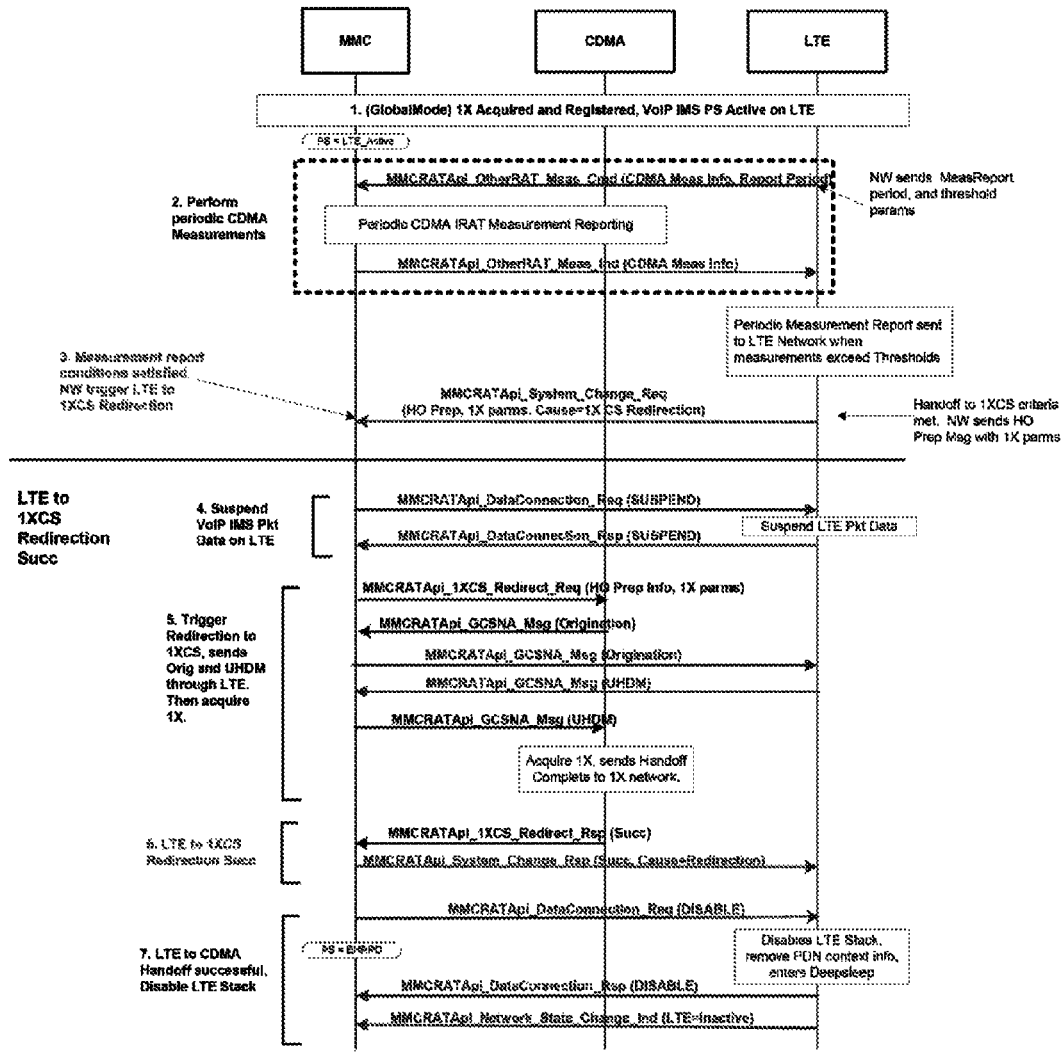
FIG. 14 is a data flow diagram showing in greater detail one embodiment of the process of FIG. 13.

FIG. 13 is a flowchart showing another embodiment of a process for performing a system redirect, while FIG. 14 is a data flow diagram showing in greater detail one embodiment of the process of FIG. 13. As shown in FIGS. 13 and 14, the initial conditions 1310 of this embodiment of the process are: (a) global mode is registered and active; (b) packet service (PS) is active on LTE; and (c) CDMA 1x CS RAT is registered. With these initial conditions, the process receives performs 1320 periodic CDMA IRAT measurement reporting by receiving MMCRATApi_OtherRAT_Meas_Cmd (CDMA_Meas_Info, Report_Period) from the LTE and sending to the LTE MMCRATApi_OtherRAT_Meas_Ind (CDMA_Meas_Info). Similar to FIGS. 9 and 10, periodic measurement reports are sent to the LTE network when measurements exceed predefined thresholds.

Based on those measurements, the process determines 1330 whether or not to initiate redirection. If no redirect is initiated, then the process continues to perform 1320 the periodic CDMA measurements. However, if the threshold for redirect is met, then the process triggers 1340 redirection, for example, with the MMC receiving from the LTE MMCRATApi_System_Change_Req (HO_Prep, 1x_Params, Cause=1x_CS_Redirection). The MMC then suspends 1350 LTE by sending MMCRATApi_DataConnection_Req (Suspend) to the LTE. The LTE then suspends the LTE packet data, and transmits to the MMC MMCRATApi_DataConnection_Rsp (Suspend), thereby suspending the VoIP IMS packet data on the LTE.

The process then continues the handoff 1360 from LTE to CDMA with the MMC sending MMCRATApi_1xCS_Redirect_Req (HO_Prep_Info, 1x_Params) to the CDMA and receiving MMCRATApi_GCSNA_Msg (Origination) from the CDMA. The MMC then sends MMCRATApi_GCSNA_Msg (Origination) to the LTE and receives MMCRATApi_GCSNA_Msg (UHDM) from the LTE, which the MMC then sends to the CDMA. The CDMA then acquires 1× and sends to the network an indication that the handoff is complete. This is done by sending MMCRATApi_1×CS_Redirect_Rsp (Success) to the MMC, which sends MMCRATApi_System_Change_Rsp (Success, Cause= Redirection) to the LTE.

The process then disables 1370 the LTE, with the MMC sending to the LTE MMCRATApi_DataConnection_Req (Disable), which disables the LTE stack, removes the PDN context information at the LTE, and places the LTE in idle mode. The PS is on CDMA (eHRPD), with the LTE sending to the MMC both MMCRATApi_DataConnection_Rsp (Disable) and MMCRATApi_Network_State_Change_Ind (LTE=Inactive).

As shown in FIGS. 3 through 14, the MMC permits implementation of a large variety of wireless configurations. By acting as the interface between the APPS and the RATs, the MMC provides flexibility and reusability that were previously unrealizable by the conventional AP. Furthermore, the MMC permits portability to different platforms and different environments, thereby allowing for simpler incorporation of new additional carrier or vendor requirements. Additionally, the MMC provides a faster time-to-market solution for multi-mode devices, which can be readily integrated into an existing vendor's RAT and application software with minimal alterations to the vendor's existing software.

The MMC may be implemented in hardware, software, firmware, or a combination thereof. In the preferred embodiment(s), the MMC is implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the MMC is implemented in software or firmware that is stored in a memory and that is executed by a suitable instruction execution system.

Any process descriptions or blocks in flowcharts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The APIs in FIGS. 15A through 19C, which comprise executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

As will be appreciated by one skilled in the art, aspects of the present invention may be embodied as a system, method or computer program product. Furthermore, aspects of the present invention may take the form of a computer program product embodied in one or more computer readable storage media having computer readable program code embodied thereon.

Any combination of one or more computer readable media may be utilized. The computer readable medium may be a computer readable signal medium or a computer readable storage medium. A computer readable storage medium includes, for example, but not limited to, a hard disk, solid state drive, a random access memory (RAM), a read-only memory (ROM), an erasable programmable read-only memory (EPROM), Flash memory, an optical storage device (e.g., CD-ROM), a magnetic storage device, or any suitable combination of the foregoing or other storage hardware. Thus, a computer readable storage medium includes any tangible medium that can contain, or store a program for use by or in connection with an instruction execution system, apparatus, or device.

A computer readable signal medium is a propagated data signal with computer readable program code embodied therein, for example, in baseband or as part of a carrier wave. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A device for wireless communication application using radio access protocols, the radio access protocols comprising a long-term evolution protocol, the radio access protocols further comprising a code division multiple access protocol, the device comprising:
   (a) an application processor to control wireless communication application on the device;
   (b) a long-term evolution stack for communication using the long-term evolution protocol;
   (c) a code division multiple access stack for communication using the code division multiple access protocol; and
   (d) a multi-mode controller residing between the application processor and the long-term evolution stack, the multi-mode controller further residing between the application processor and the code division multiple access stack, the multi-mode controller comprising:
   (d1) a multi-mode controller stack to manage inter radio access protocols operation between the long-term evolution protocol and the code division multiple access protocol, the multi-mode controller stack comprising:
      (d1A) a global mode system selection module to perform global system selection, the global system selection being based on a user input,
   a network location and a channel condition;
      (d1B) a measurement and reselection module to perform measurements on an inactive radio access protocol, the measurement and reselection module further to decide whether there should be a handoff from an active radio access protocol to the inactive radio access protocol, the inactive radio access protocol being one selected from the group consisting of the long-term evolution wireless protocol and the code division multiple access wireless protocol, wherein the measurement and reselection module works with the global mode system selection module to trigger system reselection for a system that meets a priority class value when a system becomes unavailable through one of a set of application programming interfaces residing in the multi-mode controller that acquires a Radio Access Technology (RAT) associated with a Mobile Country Code (MCC);
      (d1C) a packet data control module to handle packet service sessions; and
      (d1D) a circuit switch control module to handle circuit switch control;
   (d2) an application program interface to interface the multi-mode controller stack to the application processor;
   (d3) a long-term evolution application program interface to interface the multi-mode controller stack to the long-term evolution stack; and
   (d4) a code division multiple access application program interface to interface the multi-mode controller stack to the code division multiple access stack.

2. The device of claim 1, the global mode system selection module further to perform the global system selection based on user configuration inputs.

3. The device of claim 1, the global mode system selection module further to perform the global system selection based on a network location.

4. The device of claim 1, the global mode system selection module further to perform the global system selection based on a channel condition.

5. The device of claim 1, the measurement and reselection module further to determine whether to initiate a handoff to the inactive radio access protocol.

6. The device of claim 5, the determination of whether to initiate the handoff to the inactive radio access protocol being based on a channel condition.

7. The device of claim 5, the determination of whether to initiate the handoff to the inactive radio access protocol being based on a user input.

8. The device of claim 1, the packet data control module further to register a packet data call connection.

9. The device of claim 1, the packet data control module further to set up a packet data call connection.

10. The device of claim 1, the packet data control module further to release a packet data call connection.

11. The device of claim 1, the packet data control module further to maintain continuity in the packet service session during a handoff from the first radio access protocol to the second radio access protocol.

12. The device of claim 1, the circuit switch control module further to handle circuit switch setup.

13. The device of claim 1, the circuit switch control module further to handle circuit switch release.

14. The device of claim 1, the first RAT being a long-term evolution protocol.

15. The device of claim 1, the second RAT being a code division multiple access protocol.

16. A system for communicating using a first radio access protocol, the system further for communicating using a second radio access protocol, the system comprising:
A) a multi-mode controller residing between an application processor and a long-term evolution stack for communication using a long-term evolution protocol, the multi-mode controller further residing between the application processor and a code division multiple access stack for communication using the code division multiple access protocol, the multi-mode controller comprising:
(A1) a multi-mode controller stack to manage inter radio access protocol operation between the long-term evolution protocol and the code division multiple access protocol,
the multi-mode controller stack comprising:
(A1A) a global mode system selection module to perform global system selection, the global system selection being based on a user input, a network location and a channel condition;
(A1B) a measurement and reselection module to perform measurements on an inactive radio access protocol, the measurement and reselection module further to decide whether there should be a handoff from an active radio access protocol to the inactive radio access protocol, the inactive radio access protocol being one selected from the group consisting of the long-term evolution wireless protocol and the code division multiple access wireless protocol, wherein the measurement and reselection module works with the global mode system selection module to trigger system reselection for a system that meets a priority class value when a system becomes unavailable through one of a set of application programming interfaces residing in the multi-mode controller that acquires a Radio Access Technology (RAT) associated with a Mobile Country Code (MCC);
(A1C) a packet data control module to handle packet service sessions; and
(A1D) a circuit switch control module to handle circuit switch control;
(A2) an application program interface to interface the multi-mode controller stack to the application processor;
(A3) a long-term evolution application program interface to interface the multi-mode controller stack to the long-term evolution stack; and
(A4) a code division multiple access application program interface to interface the multi-mode controller stack to the code division multiple access stack.

17. The system of claim 16, the multi-mode controller being located on an apparatus, the apparatus being one selected from the group consisting of:
an application processor in a multi-mode device; a code division multiple access modem processor; a long-term evolution modem processor; a data card; and
a single-chip multiple radio access protocols device.

* * * * *